United States Patent
Kamiyama et al.

(10) Patent No.: US 10,198,811 B2
(45) Date of Patent: Feb. 5, 2019

(54) IMAGE PROCESSING APPARATUS, IMAGE PROCESSING METHOD, AND COMPUTER-READABLE RECORDING MEDIUM

(71) Applicant: OLYMPUS CORPORATION, Tokyo (JP)

(72) Inventors: Toshiya Kamiyama, Hachioji (JP); Yamato Kanda, Hino (JP); Makoto Kitamura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/267,888

(22) Filed: Sep. 16, 2016

(65) Prior Publication Data
US 2017/0004625 A1     Jan. 5, 2017

Related U.S. Application Data

(63) Continuation of application No. PCT/JP2015/057936, filed on Mar. 17, 2015.

(30) Foreign Application Priority Data

Mar. 20, 2014   (JP) ................................. 2014-059225

(51) Int. Cl.
*G06T 7/00*      (2017.01)

(52) U.S. Cl.
CPC .......... *G06T 7/0012* (2013.01); *G06T 7/0016* (2013.01); *G06T 2207/10004* (2013.01); *G06T 2207/10068* (2013.01)

(58) Field of Classification Search
CPC ................. G06T 7/0012; G06T 7/0016; G06T 2207/10004; G06T 2207/10068
See application file for complete search history.

(56) References Cited

U.S. PATENT DOCUMENTS 5,953,054 A * 9/1999 Mercier ............... H04N 13/221
                                                          348/50
6,373,897 B1 * 4/2002 Taniguchi ................ G08G 1/04
                                                         348/699

(Continued)

FOREIGN PATENT DOCUMENTS

CN      102469925 A      5/2012
JP      2006-154309 A    6/2006

(Continued)

OTHER PUBLICATIONS

International Search Report dated Jun. 9, 2015 issued in PCT/JP2015/057936.

(Continued)

*Primary Examiner* — Mekonen Bekele
(74) *Attorney, Agent, or Firm* — Scully, Scott, Murphy & Presser, P.C.

(57) ABSTRACT

An image processing apparatus includes: a detecting unit that detects regions of interest that are estimated as an object to be detected, from a group of a series of images acquired by sequentially imaging a lumen of a living body, and to extract images of interest including the regions of interest; a neighborhood range setting unit that sets, as a time-series neighborhood range, a neighborhood range of the images of interest in the group of the series of images arranged in time series so as to be wider than an interval between images that are continuous in time series in the group of the series of images; an image-of-interest group extracting unit that extracts an image-of-interest group including identical regions of interest from the extracted images of interest, based on the time-series neighborhood range; and a representative-image extracting unit that extracts a representative image from the image-of-interest group.

20 Claims, 24 Drawing Sheets

(56) References Cited

U.S. PATENT DOCUMENTS

| | | | |
|---|---|---|---|
| 8,107,704 B2* | 1/2012 | Kanda | A61B 1/041 128/922 |
| 8,233,037 B2* | 7/2012 | Matsui | A61B 1/0005 345/506 |
| 8,727,984 B2* | 5/2014 | Kurita | A61B 8/08 600/407 |
| 2009/0019381 A1 | 1/2009 | Kimoto | |
| 2009/0080740 A1* | 3/2009 | Shinagawa | G01R 33/5601 382/131 |
| 2009/0202117 A1* | 8/2009 | Vilarino | A61B 1/00045 382/128 |
| 2010/0099988 A1* | 4/2010 | Kurita | A61B 8/08 600/443 |
| 2010/0191081 A1* | 7/2010 | Shahidi | A61B 5/14555 600/323 |
| 2011/0069876 A1* | 3/2011 | Kanda | A61B 1/00052 382/134 |
| 2012/0114203 A1 | 5/2012 | Hirota | |
| 2013/0028485 A1* | 1/2013 | Kitamura | G06T 7/0012 382/106 |

FOREIGN PATENT DOCUMENTS

| | | |
|---|---|---|
| JP | 2006-280792 A | 10/2006 |
| JP | 2007-075155 A | 3/2007 |
| JP | 2008-036028 A | 2/2008 |
| JP | 2011-024727 A | 2/2011 |

OTHER PUBLICATIONS

Chinese Office Action dated Jun. 27, 2017 in Chinese Patent Application No. 201580012981.4.

Japanese Office Action dated Sep. 5, 2017 in Japanese Patent Application No. 2014-059225.

* cited by examiner

IMAGE PROCESSING APPARATUS, IMAGE PROCESSING METHOD, AND COMPUTER-READABLE RECORDING MEDIUM

CROSS REFERENCES TO RELATED APPLICATIONS

This application is a continuation of PCT international application Ser. No. PCT/JP2015/057936, filed on Mar. 17, 2015 which designates the United States, incorporated herein by reference, and which claims the benefit of priority from Japanese Patent Application No. 2014-059225, filed on Mar. 20, 2014, incorporated herein by reference.

BACKGROUND

1. Technical Field

The disclosure relates to an image processing apparatus, an image processing method, and a computer-readable recording medium, for extracting representative images from image groups acquired by imaging a lumen of a living body.

2. Related Art

A technology has been known that extracts, as representative images, images having regions of interest such as abnormal regions from a group of a series of images (hereinafter referred to as intraluminal image group) acquired by imaging a lumen of a living body in time-series by using a medical observation apparatus such as an endoscope or a capsule endoscope. Observation on the representative images extracted from the image groups reduces a burden on users of observing a large quantity of images and enables the users to diagnose correctly and efficiently.

For example, JP 2011-24727 A discloses an image processing apparatus which detects the regions of interest from the intraluminal image groups acquired in time-series and classifies the regions of interest into groups based on features of the regions of interest and time-series positions of intraluminal images including the regions of interest. The image processing apparatus herein further selects representative regions from the regions of interest classified into each group and outputs images including the selected representative regions as the representative images.

SUMMARY

In some embodiments, an image processing apparatus includes: a detecting unit configured to detect regions of interest that are estimated as an object to be detected, from a group of a series of images acquired by sequentially imaging a lumen of a living body, and to extract images of interest including the regions of interest; a neighborhood range setting unit configured to set, as a time-series neighborhood range, a neighborhood range of the images of interest in the group of the series of images arranged in time series so as to be wider than an interval between images that are continuous in time series in the group of the series of images; an image-of-interest group extracting unit configured to extract an image-of-interest group including identical regions of interest from the images of interest extracted by the detecting unit, based on the time-series neighborhood range; and a representative-image extracting unit configured to extract a representative image from the image-of-interest group.

In some embodiments, provided is an image processing method for causing a calculation unit of a computer to perform image processing based on image data of a group of a series of images which are acquired by sequentially imaging a lumen of a living body and recorded in a recording unit. The method includes: detecting regions of interest that are estimated as an object to be detected, from the group of the series of images, and extracting images of interest including the regions of interest; setting, as a time-series neighborhood range, a neighborhood range of the images of interest in the group of the series of images arranged in time series so as to be wider than an interval between images that are continuous in time series in the group of the series of images; extracting an image-of-interest group including identical regions of interest from the extracted images of interest, based on the time-series neighborhood range; and extracting a representative image from the image-of-interest group.

In some embodiments, provided is a non-transitory computer-readable recording medium with an executable program stored thereon. The program causes a computer to execute: detecting regions of interest that are estimated as an object to be detected, from a group of a series of images acquired by sequentially imaging a lumen of a living body, and extracting images of interest including the regions of interest; setting, as a time-series neighborhood range, a neighborhood range of the images of interest in the group of the series of images arranged in time series so as to be wider than an interval between images that are continuous in time series in the group of the series of images; extracting an image-of-interest group including identical regions of interest from the extracted images of interest, based on the time-series neighborhood range; and extracting a representative image from the image-of-interest group.

The above and other features, advantages and technical and industrial significance of this invention will be better understood by reading the following detailed description of presently preferred embodiments of the invention, when considered in connection with the accompanying drawings.

DETAILED DESCRIPTION

Hereinafter, an image processing apparatus, an image processing method, and an image processing program according to embodiments of the present invention will be described with reference to the accompanying drawings. Note that the present invention should not be limited to these embodiments. The same reference signs are used to designate the same elements throughout the drawings.

First Embodiment

Figure 1:
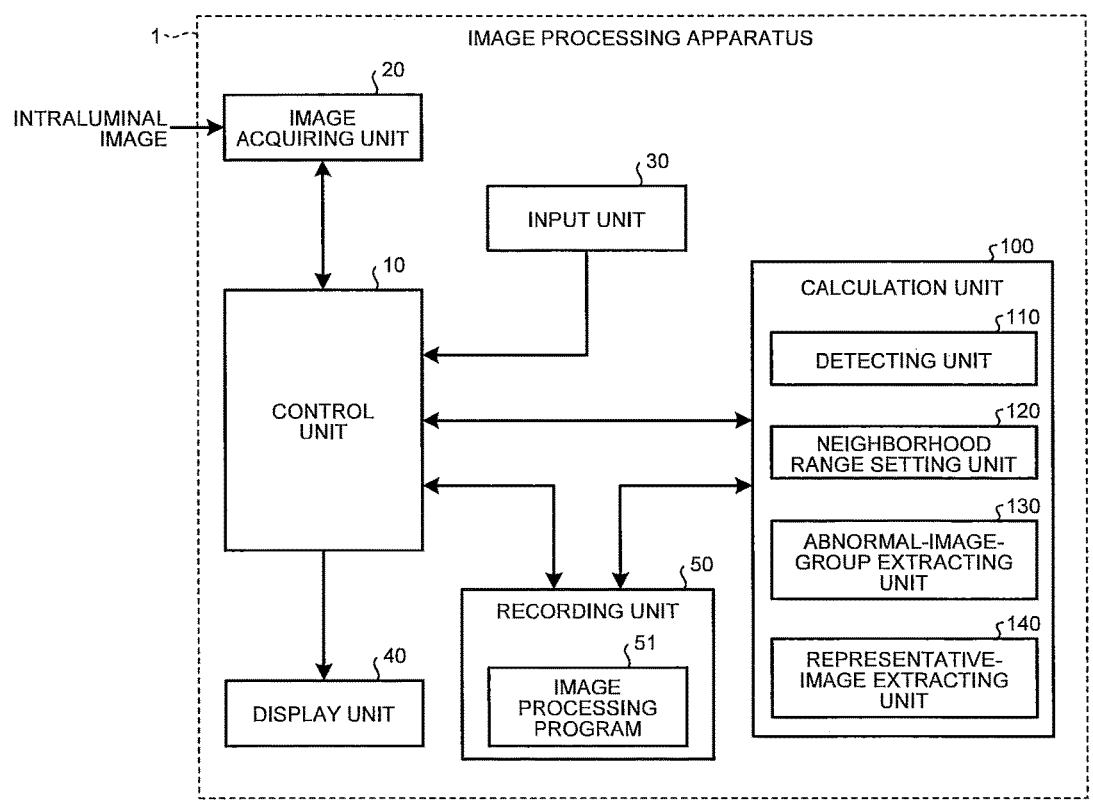
FIG. 1 is a block diagram illustrating a configuration of an image processing apparatus according to a first embodiment of the present invention.

FIG. 1 is a block diagram illustrating a configuration of an image processing apparatus according to a first embodiment of the present invention. An image processing apparatus 1 according to the first embodiment is an apparatus which extracts image (image-of-interest) groups including regions of interest that are estimated as objects to be detected, from a group of a series of images acquired by sequentially imaging a lumen of a living body, which is a subject, by using a medical image apparatus such as a capsule endoscope. The image processing apparatus 1 then extracts representative images from the extracted image-of-interest group. Images showing a lumen of a living body (also referred to as intraluminal images) are usually color images having pixel levels (pixel values) with respect to wavelength components of red (R), green (G), blue (B) in each pixel position. Hereinafter, reference will be made to a case of detecting, as the regions of interest, abnormal regions such as bleeding, redness, vascular abnormality, an aphtha, and an ulcer, and extracting the representative images from the image-of-interest (abnormal image) groups each including these abnormal regions. However, the regions of interest is not be limited to the abnormal regions recited above.

As illustrated in FIG. 1, the image processing apparatus 1 includes a control unit 10, an image acquiring unit 20, an input unit 30, a display unit 40, a recording unit 50, and a calculation unit 100. The control unit 10 controls operations of the whole image processing apparatus 1. The image acquiring unit 20 acquires image data corresponding to the intraluminal images captured by a medical observation apparatus such as a capsule endoscope. The input unit 30 inputs, into the control unit 10, signals in accordance with operations from an outside thereof. The display unit 40 displays various information and images. The recording unit 50 stores various programs and image data acquired by the image acquiring unit 20. The calculation unit 100 performs predetermined image processing on the image data.

The control unit 10 is achieved by hardware such as a CPU. By reading out the various programs recorded in the recording unit 50, the control unit 10, for example, gives instructions and transfers data to each unit included in the image processing apparatus 1 in accordance with the image data inputted from the image acquiring unit 20 or the signals inputted from the input unit 30 and the like. The control unit 10 performs overall control of the operations of the whole image processing apparatus 1.

The image acquiring unit 20 is appropriately configured in accordance with an aspect of a system having the capsule endoscope for imaging the inside of the subject. For example, if a portable recording medium for transferring image data between the capsule endoscope and the image acquiring unit 20 is employed, the image acquiring unit 20 includes a reader to which the recording medium is attachable, and reads out image data of recorded images. If a server for storing image data of images captured by the capsule endoscope is employed, the image acquiring unit 20 includes a communication device configured to be connected to the server and acquires the image data by carrying out data communication with the server.

The input unit 30 is achieved by an input device such as a keyboard, a mouse, a touch panel, and various switches. The input unit 30 outputs, to the control unit 10, input signals generated in accordance with operations from an outside with respect to these input devices.

The display unit 40 is achieved by a display device such as an LCD or an EL display. The display unit 40 displays various screens including the intraluminal images under a control of the control unit 10.

The recording unit 50 is achieved, for example, by various IC memories such as ROM and RAM of an updatable flash memory, a built-in hard disk, a hard disk connected to a data communication terminal, or an information recording device such as CD-ROM and a reader thereof. The recording unit 50 stores the image data of the intraluminal images acquired by the image acquiring unit 20. In addition, the recording unit 50 stores a program which drives the image processing apparatus 1 and allows the image processing apparatus 1 to carry out various performances and also stores data and the like which are used during execution of the program. Specifically, the recording unit 50 stores an image processing program 51, a determination criteria, and the like. The image processing program 51 allows the image processing apparatus 1 to carry out image processing in which the abnormal regions such as bleeding, redness, aphtha, and ulcer are detected from the intraluminal images, and the abnormal image groups each including identical abnormal regions are extracted from the images (abnormal images) including these abnormal regions, and then the representative images are extracted from each of the abnormal image groups. The determination criteria are used for detecting these abnormal regions.

The calculation unit 100 is achieved by the hardware such as a CPU. Reading the image processing program 51, the calculation unit 100 carries out the image processing in which the abnormal image groups each including the identical abnormal regions are extracted from the intraluminal images and the representative images are extracted from each of the abnormal image groups.

Next, a configuration of the calculation unit 100 will be described. As illustrated in FIG. 1, the calculation unit 100 includes a detecting unit 110, a neighborhood range setting unit 120, an abnormal-image-group extracting unit 130, and a representative-image extracting unit 140. The detecting unit 110 detects the abnormal images including the abnormal regions from the series of the intraluminal images. The neighborhood range setting unit 120 sets, as a time-series neighborhood range, a neighborhood range of each abnormal image in the intraluminal images arranged in time-series. The abnormal-image-group extracting unit 130 extracts the abnormal image groups each including the identical abnormal regions from the abnormal images detected by the detecting unit 110 based on each time-series neighborhood range. The representative-image extracting unit 140 extracts the representative images from each of the extracted abnormal image groups.

The detecting unit 110 detects the abnormal regions based on various features of the intraluminal images. Various known methods are applicable for detecting the abnormal regions. For example, in the first embodiment, first, spatially adjacent pixels having similar features are merged so as to divide an image into a plurality of small regions (Reference: CG-ARTS, Digital Image Processing, second edition, p. 196 (region dividing process due to merging of adjacent pixels)). Then, a color feature of each small region is calculated. Herein, determination criteria of color features of the abnormal regions have been established in advance. Comparing the calculated color feature with the determination criteria, small regions indicating characteristics of the abnormal regions are extracted.

Examples of the color features include each color component (R component, G component, B component) in pixels included in the divided small regions, and statistics of average values or middle values of values secondarily calculated by known conversion based on each of these color components (for example, color differences calculated by YCbCr conversion, and hue, saturation, color ratios of G/R, B/G, and the like calculated by HSI conversion.). Furthermore, the determination criteria are recorded in the recording unit 50 as gathering the color features of the various abnormal regions in advance and establishing the determination criteria (color range) of the abnormal regions in advance with learning tools such as a support vector machine (SVM) based on distribution of these color features. Specifically, the abnormal regions such as bleeding, redness, and vascular abnormality indicate a specific color in red tone, while the abnormal regions such as ulcer and aphtha indicate a specific color in white tone. Therefore, the abnormal regions can be detected by extracting the small regions indicating these specific colors.

Furthermore, structural features such as inflammation of a mucosa may be shown in the abnormal regions. Such abnormal regions may be detected by capturing the structural features. Specifically, intensity of each frequency component is acquired as the structural features by converting the intraluminal images into images per frequency component by known Difference of Gaussian (DOG, Reference: Advanced Communication Media Co., Ltd., Computer Vision and Image Media 2, pp. 7-12.). The abnormal regions are detected by determination, with the determination criteria made in advance, in feature spaces including the above-mentioned color features and structural features.

What has been described above is a case where the intraluminal images are divided into the small regions and the abnormal regions are detected with the color features (or structure features) in units of the small regions. However, note that the abnormal regions may also be detected with color features (or structure features) in units of pixels included in the intraluminal images.

The neighborhood range setting unit 120 sets the time-series neighborhood range with respect to each of the abnormal images extracted by the detecting unit 110. Herein, the time-series neighborhood range represents a range including an abnormal image of the intraluminal images arranged in time-series and a neighbor image thereof. Furthermore, the time-series neighborhood range represents a range of one abnormal image group, including identical abnormal regions, extracted by the abnormal-image-group extracting unit 130. A range wider than an interval between the intraluminal images that are continuous in time-series in the series of the intraluminal images is set as the time-series neighborhood range.

The abnormal-image-group extracting unit 130 is an image-of-interest group extracting unit which extracts, as the abnormal image groups each including the identical abnormal regions, the abnormal images included in each time-series neighborhood range set by the neighborhood range setting unit 120.

The representative-image extracting unit 140 extracts the representative images from each abnormal image group including the identical abnormal regions. A method for extracting the representative images is not specifically limited. A first image and middle image in time-series of each abnormal image group may be simply extracted as the representative images. Alternatively, after image diagnosis, abnormal images including abnormal regions with high degree of importance or abnormal images including abnormal regions with good visibility may be extracted as the representative images. The degree of importance and the visibility of the abnormal regions can be determined, for example, based on shape features, texture features, and the like of the abnormal regions as well as the color features of the abnormal regions.

Figure 2:
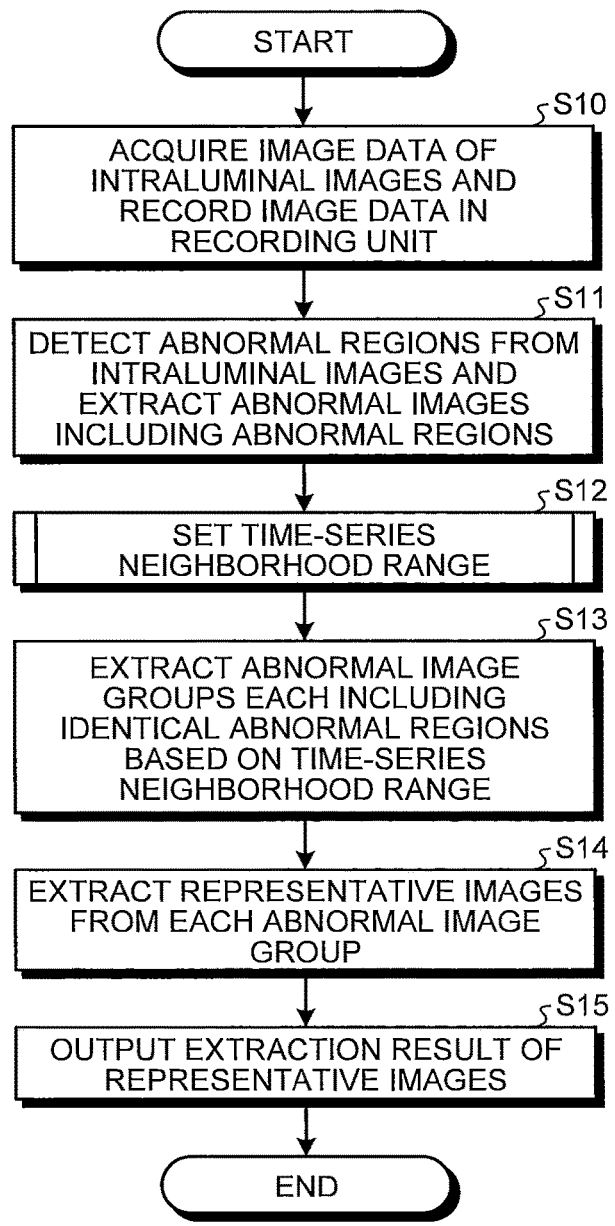
FIG. 2 is a flowchart illustrating operations of the image processing apparatus illustrated in FIG. 1.

Next, operations of the image processing apparatus 1 illustrated in FIG. 1 will be described. FIG. 2 is a flowchart illustrating the operations of the image processing apparatus 1.

First, in step S10, the image processing apparatus 1 acquires, through the image acquiring unit 20, the image data of the series of the intraluminal images captured in time-series and then records the image data in the recording unit 50.

In next step S11, the detecting unit 110 sequentially reads out the image data of the intraluminal images recorded in the recording unit 50 and detects the abnormal region from each intraluminal image so as to extract the abnormal images including the abnormal regions. Specifically, the detecting unit 110 reads out the determination criteria of the abnormal regions recorded in the recording unit 50 in advance, and compares each color feature of each pixel included in each intraluminal image with the determination criteria so as to detect the abnormal regions.

Figure 3:
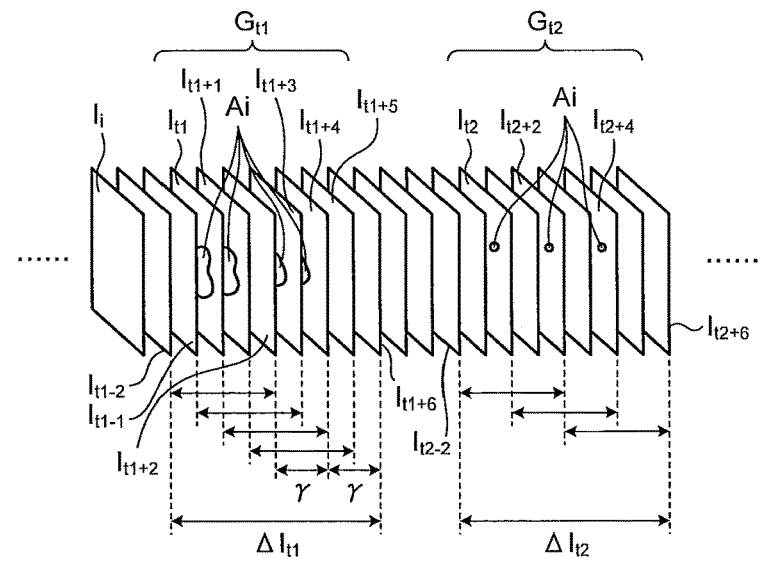
FIG. 3 is a schematic view illustrating a series of intraluminal images acquired in time-series.

FIG. 3 is a schematic view illustrating a series of intraluminal images $I_i$ acquired in time-series. Herein, the accompanying letter i (i=1, 2, . . . ) indicates an order of arrangement (image capturing order) in time-series of each intraluminal image and corresponds to an image number. By the process in step S11, abnormal regions $A_i$ (i=t1, t1+2, t1+3, t1+4, t2, t2+2, t2+4) are detected and the intraluminal images $I_i$ including each of the abnormal regions $A_i$ are extracted. Hereinafter, an intraluminal image $I_i$ including an abnormal region $A_i$ is also denoted as an abnormal image $I_i$.

In next step S12, the neighborhood range setting unit 120 sets, as the time-series neighborhood range, the range wider than the interval (±1 images) between the intraluminal images that are continuous in time-series in the series of the intraluminal images with respect to each abnormal image $I_i$ extracted in step S11. Specifically, the neighborhood range setting unit 120 sets, as one time-series neighborhood range, the intraluminal images within ±γ range in which an abnormal image $I_i$ is centered in the series of the intraluminal images arranged in time-series. Herein, a parameter γ is for determining a width of each time-series neighborhood range. In the first embodiment, the parameter γ is set to be a constant not less than 2.

Herein, a time-series neighborhood range set on an abnormal image may overlap with a time-series neighborhood range set on another abnormal image. In this case, the partially overlapping time-series neighborhood ranges are merged by the neighborhood range setting unit 120 so as to be set as one time-series neighborhood range. For example, in a case of FIG. 3, assuming that the parameter γ=2, a time-series neighborhood range (intraluminal images $I_{t1-2}$ to $I_{t1+2}$) of an abnormal image $I_{t1}$, a time-series neighborhood range (intraluminal images $I_{t1-1}$ to $I_{t1+3}$) of an abnormal image $I_{t1+1}$, a time-series neighborhood range (intraluminal images $I_{t1+1}$ to $I_{t1+5}$) of an abnormal image $I_{t1+3}$, and a time-series neighborhood range (intraluminal images $I_{t1+2}$ to $I_{t1+6}$) of an abnormal image $I_{t1+4}$ are partially overlapping between the adjacent time-series neighborhood ranges. Therefore, these time-series neighborhood ranges are merged so as to set a merged time-series neighborhood range $\Delta I_{t1}$ including the intraluminal images $I_{t1-2}$ to $I_{t1+6}$. Furthermore, a time-series neighborhood range (intraluminal images $I_{t2-2}$ to $I_{t2+2}$) of an abnormal image $I_{t2}$, a time-series neighborhood range (intraluminal images $I_{t2}$ to $I_{t2+4}$) of an abnormal image $I_{t2+2}$, and a time-series neighborhood range (intraluminal images $I_{t2+2}$ to $I_{t2+6}$) of an abnormal image $I_{t2+4}$ are partially overlapping between the adjacent time-series neighborhood ranges. Therefore, these time-series neighborhood ranges are merged so as to set a merged time-series neighborhood range $\Delta I_{t2}$ including the intraluminal images $I_{t2-2}$ to $I_{t2+6}$.

In next step S13, the abnormal-image-group extracting unit 130 extracts the abnormal image groups each including identical abnormal regions based on each time-series neighborhood range set in step S12. Specifically, the abnormal images included in one time-series neighborhood range are regarded as one abnormal image group including the identical abnormal region.

For example, in a case of FIG. 3, the abnormal images $I_{t1}$, $I_{t1+1}$, $I_{t1+3}$, and $I_{t1+4}$ included in the merged time-series neighborhood range $\Delta I_{t1}$ are extracted as an identical abnormal image group $G_{t1}$, while the abnormal images $I_{t2}$, $I_{t2+2}$, and $I_{t2+4}$ included in the merged time-series neighborhood range $\Delta I_{t2}$ are extracted as an identical abnormal image group $G_{t2}$.

In next step S14, the representative-image extracting unit 140 extracts one or more representative images from each of the abnormal image groups extracted in step S13. The number of the representative images to be extracted may be constant (for example, one representative image from each abnormal image group), or may be determined in accordance with the number of the abnormal images included in each abnormal image group (for example, r times of the number of the abnormal images, 0<r<1). Note that in the latter case, when the number of the representative images is less than one, at least one representative image will be extracted. Alternatively, without specifying the number of the representative images to be extracted, all abnormal images (for example, an abnormal image having a color feature more than a predetermined threshold) which satisfy a predetermined criterion may be extracted as the representative images.

The method for extracting the representative images should not be specifically limited. For example, the first image and middle image in time-series of each abnormal image group may be extracted as the representative images. Alternatively, the representative images may be extracted based on the color features of the identical abnormal region in each abnormal image group. Specifically, in a case where the abnormal regions indicate a specific reddish color, abnormal images including abnormal regions with an intense red color are extracted with priority as the representative images. Alternatively, in a case where the abnormal regions indicate a specific whitish color, abnormal images including abnormal regions with an intense white color are extracted with priority as the representative images.

Furthermore, abnormal images with high visibility may be extracted as the representative images. Specifically, examples of the abnormal images with the high visibility include an abnormal image including an abnormal region of the largest area and an abnormal image including an abnormal region of the highest contrast. Herein, the areas of each abnormal region are represented by the total number of pixels in the abnormal region. On the other hand, contrast C of each abnormal region is given by the following Formula (1) where a maximum value and a minimum value of pixel values in the abnormal region are denoted by $L_{max}$ and $L_{min}$, respectively.

$$C=(L_{max}-L_{min})/(L_{max}+L_{min}) \qquad (1)$$

Alternatively, an abnormal image having the highest contrast of the whole image may be extracted as the representative image.

Note that in a case where one abnormal image group includes a plurality of abnormal images each having the abnormal region of the largest area, or in a case where one abnormal image group includes a plurality of abnormal images each having the abnormal region of the highest contrast, the representative images may be randomly selected from those plurality of images. In the latter case, the representative images may be selected by using both the contrast of the abnormal region and the contrast of the whole image.

Furthermore, an abnormal image including an abnormal region much closer to the center of the image, an abnormal image with less noise in an abnormal region and in the whole image, an abnormal image with high luminance, and an abnormal image with less blurs may also be extracted as the abnormal images with the high visibility (representative images.)

In next step S15, the calculation unit 100 outputs information indicating the representative images extracted from each abnormal image group in step S14. In accordance with the information, the recording unit 50 applies information (flag) to the image data of the intraluminal images extracted as the representative images. Such information (flag) indicates that the image data are the representative images.

As mentioned above, according to the first embodiment of the present invention, the range wider than the interval between the images that are continuous in time-series in the group of the series of images is set with respect to each abnormal image as the time-series neighborhood range. Furthermore, in a case where time-series neighborhood ranges set on different abnormal images are overlapping, these time-series neighborhood ranges are merged and the abnormal images included in one time-series neighborhood range are extracted as an identical abnormal image group. Therefore, even though it is difficult to keep imaging a subject in a stable state due to characteristics of a living body or changes in image capturing conditions, it is possible to prevent the abnormal images including the identical abnormal regions from dispersing into different abnormal image groups. Accordingly, by extracting the representative images from each of the abnormal image groups in which the abnormal images have been grouped properly, it is possible to cover the detected abnormal regions and also to acquire the representative images whose number of extraction has been reduced. As a result, it is possible for users to diagnose correctly and efficiently.

Second Embodiment

Figure 4:
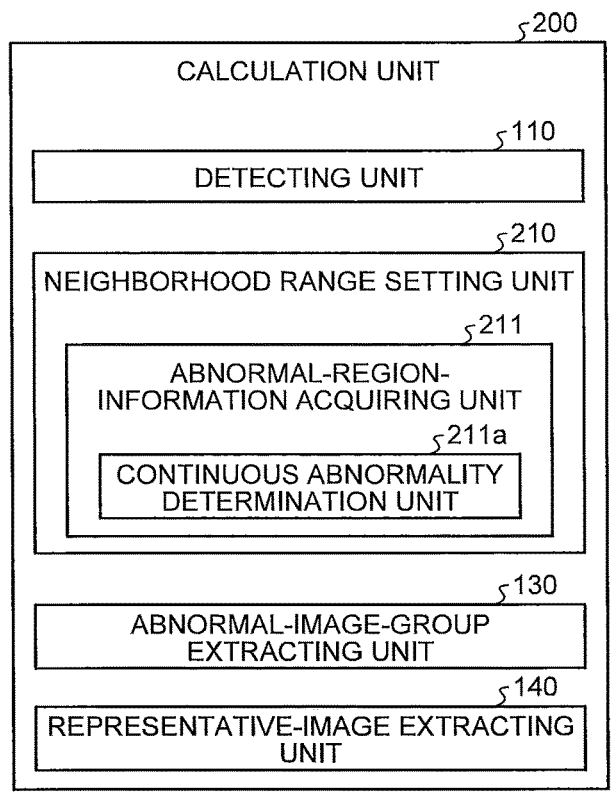
FIG. 4 is a block diagram illustrating a configuration of a calculation unit included in an image processing apparatus according to a second embodiment of the present invention.

Next, a second embodiment of the present invention will be described. FIG. 4 is a block diagram illustrating a configuration of a calculation unit of an image processing apparatus according to the second embodiment of the present invention. As illustrated in FIG. 4, the image processing apparatus according to the second embodiment includes a calculation unit 200 in place of the calculation unit 100 illustrated in FIG. 1. The calculation unit 200 includes a neighborhood range setting unit 210 in place of the neighborhood range setting unit 120 illustrated in FIG. 1. An operation of each unit in the calculation unit 200 except for the neighborhood range setting unit 210, and the configuration and the operation of each unit in the image processing apparatus except for the calculation unit 200 are similar to those in the first embodiment.

The neighborhood range setting unit 210 adaptively sets a time-series neighborhood range, within a range wider than an interval between intraluminal images that are continuous in time-series in a series of intraluminal images, in accordance with characteristics of each abnormal region. More specifically, the neighborhood range setting unit 210 includes an abnormal-region-information acquiring unit 211 which is a region-of-interest information acquiring unit for acquiring information on the abnormal region (hereinafter referred to as abnormal region information) and sets the time-series neighborhood range based on the abnormal region information.

In the second embodiment, the abnormal-region-information acquiring unit 211 classifies types of each abnormal region and regards a classification result as the abnormal region information. Herein, each abnormal region detected from the intraluminal images can be specifically classified into the followings. That is, an abnormal region which continuously occurs in a lumen (hereinafter referred to as continuous abnormal region) such as bleeding, vascular abnormality, and mucosal abnormality, and an abnormal region which intermittently occurs in the lumen (hereinafter referred to as intermittent abnormal region) such as redness, a bleeding point, and the ulcer. The continuous abnormal region is an abnormal region comparatively continuously observable in a plurality of intraluminal images arranged in time-series. On the other hand, the intermittent abnormal region is an abnormal region comparatively intermittently observable in the plurality of intraluminal images arranged in time-series.

The abnormal-region-information acquiring unit 211 includes a continuous abnormality determination unit (continuity determination unit) 211a which determines among these various abnormal regions whether each abnormal region is the continuous abnormal region such as bleeding, vascular abnormality, and mucosal abnormality.

Next, operations of the image processing apparatus according to the second embodiment will be described. The operations of the image processing apparatus according to the second embodiment are similar in whole to FIG. 2 referred to in the first embodiment, except that the operation of setting the time-series neighborhood range in step S12 illustrated in FIG. 2 is different from that of the first embodiment.

Figure 5:
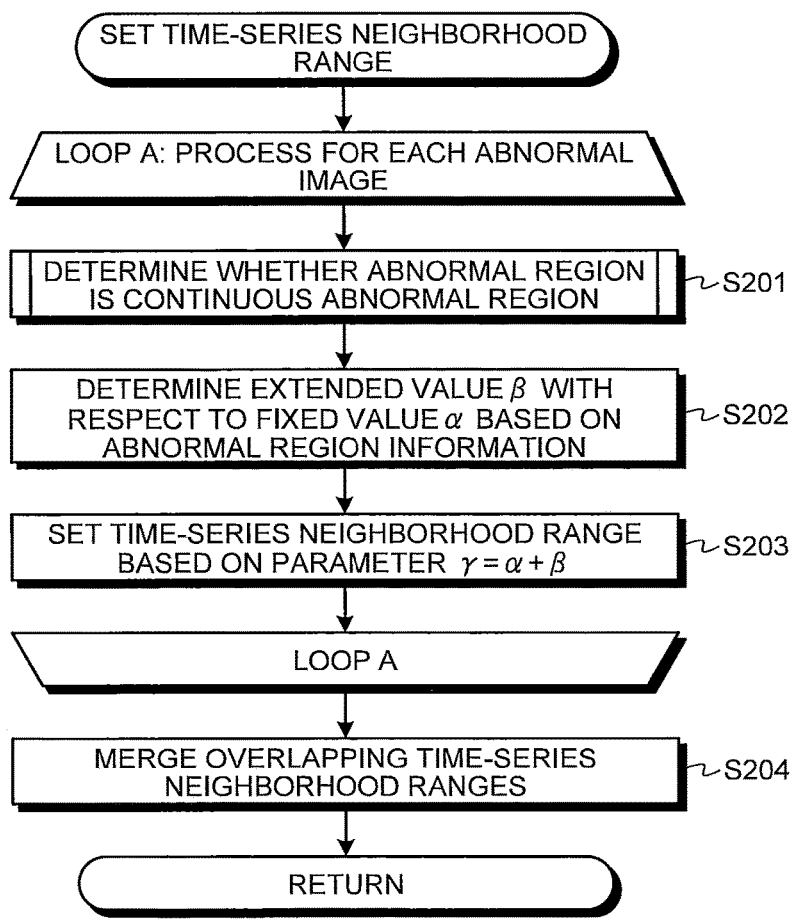
FIG. 5 is a flowchart illustrating an operation of setting a time-series neighborhood range carried out by a neighborhood range setting unit illustrated in FIG. 4.

FIG. 5 is a flowchart illustrating an operation of setting the time-series neighborhood range carried out by the neighborhood range setting unit 210 in step S12 illustrated in FIG. 2. The neighborhood range setting unit 210 carries out a process of loop A in regard to each abnormal image extracted from the series of the intraluminal images (see step S11).

First, in step S201, the continuous abnormality determination unit 211a determines whether an abnormal region included in an abnormal image is the continuous abnormal region such as bleeding, mucosal abnormality, and vascular abnormality. Herein, the bleeding indicates a state where blood is bleeding from an intraluminal mucosa. The mucosal abnormality indicates a state where a surface of the intraluminal mucosa is hypertrophied or atrophied. The vascular abnormality indicates a state where a blood vessel is unnaturally expanded or meandered.

Figure 6:
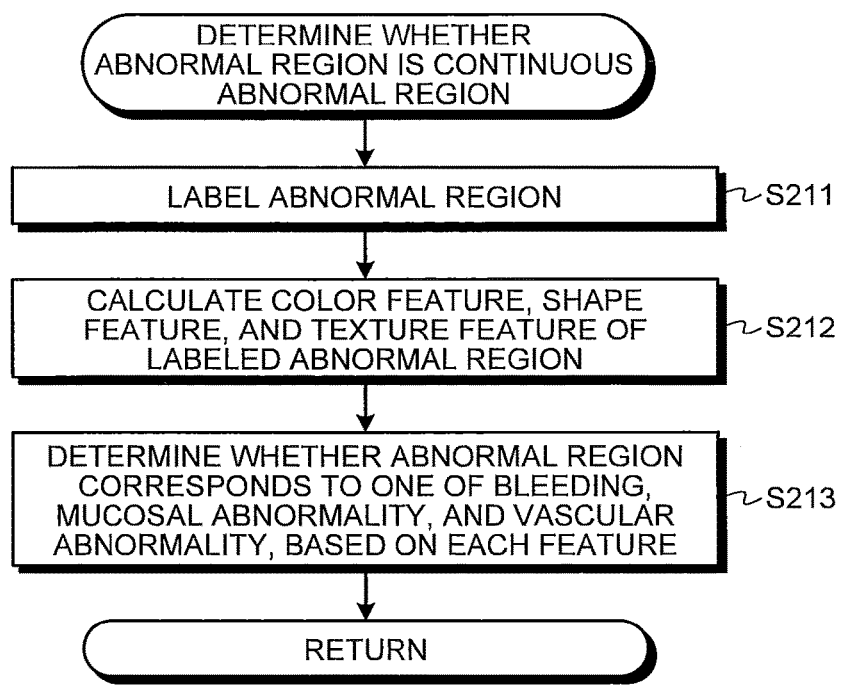
FIG. 6 is a flowchart illustrating a process of determining a continuous abnormal region carried out by a continuous abnormality determination unit illustrated in FIG. 4.

FIG. 6 is a flowchart illustrating a process of determining the continuous abnormal region carried out by the continuous abnormality determination unit 211a. In step S211 illustrated in FIG. 6, the continuous abnormality determination unit 211a carries out labeling with respect to the abnormal region in the abnormal image. Known methods are applicable for the labeling (Reference: CG-ARTS, Digital Image Processing, second edition, pp. 181-182).

In next step S212, the continuous abnormality determination unit 211a calculates a color feature, shape feature, and texture feature of the labeled abnormal region. Herein, the bleeding has a reddish color, a comparatively large area, a substantially circular or elliptic shape, and a smooth texture. Furthermore, the mucosal abnormality has a slightly red color or color of the mucosa, an indeterminate shape, extreme unevenness, and a harsh texture. The vascular abnormality has a reddish color, a comparatively large area, a linear shape, and a smooth texture. As mentioned above, each abnormal region has a specific color, shape, and texture per type such as bleeding, mucosal abnormality, and vascular abnormality. With respect to each abnormal region, the continuous abnormality determination unit 211a calculates the color feature, shape feature, and texture feature which numerically express each of these colors, shapes, and textures.

Examples of the color feature include each color component (R component, G component, B component) of the pixel values, and statistic values of the average values or the middle values and the like of the values secondarily calculated by the known conversion based on each of these color components (for example, the color differences calculated by the YCbCr conversion, and the hue, saturation, color ratios of G/R, B/G, and the like calculated by the HSI conversion.). Alternatively, a histogram in an HSI color space may be used as the color feature.

Examples of the shape features include histograms of oriented gradients (HOG), areas, circularity, a boundary length, a shape feature parameter of a Feret's diameter (Reference: Takayoshi Yamashita, et al. "3.2.2. HOG Feature" from Efficient Features for Object Recognition, Research Report from Information Processing Society of Japan, Society for Computer Vision and Image Media, CVIM2008 165-32, pp. 221-236 (2008 Nov. 27-28), CG-ARTS, Digital image processing, second edition, pp. 183-184, University of Tokyo Press, Image Analysis Handbook, p. 580). Herein, the areas are the total number of pixels labeled in step S211. The boundary length is given by $C_1+(\sqrt{2})C_2$ when carrying out contour tracking of eight-connectivity (Reference: CG-ARTS, Digital Image Processing, second edition, pp. 178-179) where the number of pixels obtained by tracking vertically and horizontally is denoted by $C_1$, and the number of pixels obtained by tracking obliquely is denoted by $C_2$. The circularity is given by $4\pi S/L^2$ where the areas of each abnormal region are denoted by S and the boundary length thereof is denoted by L. As the value comes closer to 1, the shape comes closer to a perfect circle. Note that in order to determine how far the shape of each abnormal region is from the perfect circle, a parameter $(1-4\pi S/L^2)$ may be used in place of the circularity. The Feret's diameter is a parameter which determines whether the shape of each abnormal region is linear or determines how wide it is if the shape is linear. The Feret's diameter is represented by a horizontal Feret's diameter and a vertical Feret's diameter.

An example of the texture features includes a known technology, that is, a local binary pattern (LBP) (Reference: Ryusuke Nosaka, et al. "2. LBP Histogram" from Feature Extraction Based on Adjacency Relationship of Local Binary Patterns, Research Report from The Institute of Electronics, Information and Communication Engineers, Pattern Recognition and Media Understanding, PRMU2011-69, pp. 75-80 (2011 Sep. 5-6)). The LBP is a feature representing a relationship of sizes between a pixel of interest and its surrounding eight pixels by a 256-dimensional histogram, which is the eighth power of two. In a case of applying the LBP to the second embodiment, a relationship of the sizes between each pixel in the abnormal region and its surrounding eight pixels is represented by the histogram and is referred to as the texture features.

In next step S213, the continuous abnormality determination unit 211a determines, based on each feature, whether the abnormal region corresponds to one of the bleeding, mucosal abnormality, and vascular abnormality. Specifically, first, a characteristic vector x of k×1 matrix is created for an abnormal region to be determined, by normalizing each of the features calculated in step S212 and then weighting and merging the same. A dimension number k of the feature vector x is equal to k=3, for example, in a case where a value of each component of R, G, B is used as the features.

Using a discriminant function of the abnormal region made in advance, the abnormal region is classified. In practice, as shown in the following Formula (2), a classification index P(x) based on a probability model is calculated. When the classification index P(x) is not less than a threshold, the abnormal region is determined as the bleeding, mucosal abnormality, or the vascular abnormality.

$$P(x) = \frac{1}{(2\pi)^{k/2} \times |Z|^{1/2}} \exp\left\{(x-\mu)^t \times \left(-\frac{1}{2}\right) Z^{-1} \times (x-\mu)\right\} \quad (2)$$

The classification index P(x) given by the Formula (2) indicates whether the feature vector x is any one of the bleeding, mucosal abnormality, and vascular abnormality. The symbol Z is a variance-covariance matrix (k×k matrix) of the feature vector in a sample of a plurality of abnormal regions acquired in advance. The symbol |Z| represents a determinant of the variance-covariance matrix Z. The symbol $Z^{-1}$ represents an inverse determinant of the variance-covariance matrix Z. The symbol μ is an average vector (k×1 matrix) of the feature vector in the sample of the plurality of abnormal regions acquired in advance.

After determining whether the abnormal region is the continuous abnormal region, the operation of the neighborhood range setting unit 210 returns to a main routine. A method for classifying the abnormal region using the probability model has been described above. However, other methods are also applicable if it is possible to determine whether the abnormal region is the continuous abnormal region (bleeding, mucosal abnormality, and vascular abnormality). An example of such a method includes one that is based on a feature space distance between the feature vector of the abnormal region to be determined and a typical feature vector of the continuous abnormal region. Furthermore, a method for setting a classification boundary in the feature space may also be applicable.

In step S202 after step S201, the neighborhood range setting unit 210 acquires a determination result of the abnormal region in step S201 as the abnormal region information. The neighborhood range setting unit 210 then determines, based on the abnormal region information, an extended value β with respect to a fixed value α in a parameter γ (γ=α+β) which determines the time-series neighborhood range. Herein, the fixed value α is a constant not less than 1. In the second embodiment, the extended value β is adaptively determined in accordance with the classification result of the abnormal region. The fixed value α and the extended value β are set such that the parameter γ, which is the sum of those values, is larger than the interval (one image) between the intraluminal images that are continuous in time-series in the series of the intraluminal images (namely, γ≥2).

If the determination result of the abnormal regions in step S201 is the continuous abnormal regions, the neighborhood range setting unit 210 sets a value of 1 or more for the extended value β=$β_1$. Herein, blood, mucosal abnormality, and vascular abnormality, each being the continuous abnormal region, respectively have characteristics of flowing, spreading, and being determined not locally but globally. Therefore, each of these continuous abnormal regions has a high probability of spreading widely in the lumen. Accordingly, in a case where continuous abnormal regions are detected in an intraluminal image group, a possibility that images showing identical continuous abnormal regions appear widely is considered to be higher than in a case where the abnormal regions are not the continuous abnormal regions. Accordingly, the extended value $\beta_1$ is set to be a comparatively large value (for example, $\beta_1$=5 to 20 approximately). In this case, the extended value $\beta_1$ may be changed in accordance with each type of each abnormal region (bleeding, mucosal abnormality, and vascular abnormality) or may be uniformed.

On the other hand, as a result of the determination in step S201, when the abnormal region is not determined as the continuous abnormal region, the neighborhood range setting unit 210 sets a value smaller than the extended value $\beta_1$ for the extended value $\beta=\beta_2$ (for example, $\beta_2$=1 to 5 approximately). If the parameter $\gamma$ can be eventually set to 2 or more, note that the extended value $\beta_2$ may be set to zero or to a negative value depending on the value of the fixed value $\alpha$.

In next step S203, the neighborhood range setting unit 210 sets the time-series neighborhood range based on the parameter $\gamma=\alpha+\beta$. In other words, the parameter $\gamma$ is calculated with the extended value $\beta$ determined in accordance with types of an abnormal region included in an abnormal image to be processed. Then, the intraluminal images within $\pm\gamma$ range in which the abnormal image is centered are set as one time-series neighborhood range.

The process of the loop A is carried out with respect to all abnormal images extracted from the series of the intraluminal images. Thereafter, in next step S204, when some parts of time-series neighborhood ranges set on abnormal images different from each other are overlapping, the neighborhood range setting unit 210 merges the overlapping time-series neighborhood ranges so as to set them as one time-series neighborhood range. Thereafter, the operations of the calculation unit 200 return to a main routine.

As described above, according to the second embodiment of the present invention, in a case where each abnormal region is the continuous abnormal region such as bleeding, mucosal abnormality, and vascular abnormality, each time-series neighborhood range can be set much wider than in a case where each abnormal region is not the continuous abnormal region. Accordingly, even in a case where identical abnormal regions are detected from a wide range of the series of the intraluminal images, abnormal images including these abnormal regions can be grouped into an identical abnormal image group so that representative images can be extracted properly.

In the second embodiment, the parameter $\gamma$ is calculated as the sum of the fixed value $\alpha$ and the extended value $\beta$. However, note that a coefficient $\beta'$ or a multiplier $\beta''$ may be determined in place of the extended value $\beta$ based on the abnormal region information and the parameter $\gamma$ may be calculated as $\gamma=\alpha\times\beta'$ or $\gamma=\alpha^{\beta''}$ in step S203. In this case, when the abnormal regions are the continuous abnormal regions, the coefficient $\beta'$ or the multiplier $\beta''$ is set to be higher than in a case where the abnormal regions are not the continuous abnormal regions.

Alternatively, an average value of the number of abnormal images that include continuous abnormal regions and are continuous in the intraluminal images (hereinafter referred to as average continuous number) may be acquired in advance, and types and the average continuous number of the continuous abnormal regions may be stored in a table and recorded in the recording unit 50 in advance. In this case, the neighborhood range setting unit 210 may read out the table from the recording unit 50 and extract the average continuous number in accordance with the determination result in step S201 and set the average continuous number as the time-series neighborhood range.

Modification 2-1

Figure 7:
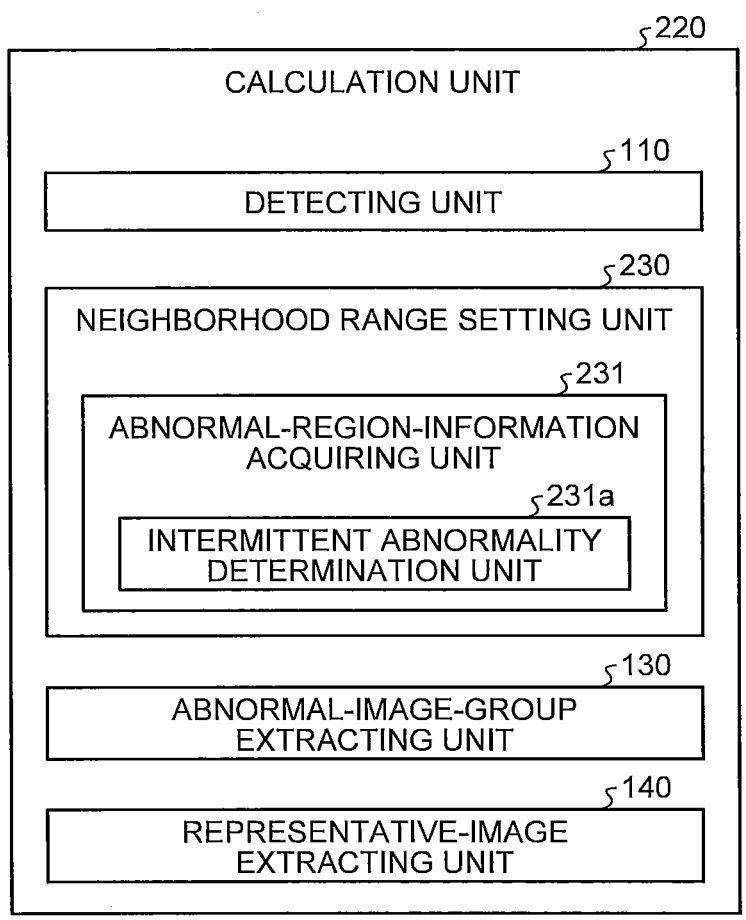
FIG. 7 is a block diagram illustrating a configuration of a calculation unit included in an image processing apparatus according to a modification 2-1 of the second embodiment of the present invention.

Next, a modification 2-1 of the second embodiment of the present invention will be described. FIG. 7 is a block diagram illustrating a configuration of a calculation unit of an image processing apparatus according to the modification 2-1 of the second embodiment of the present invention. As illustrated in FIG. 7, a calculation unit 220 in the modification 2-1 includes a neighborhood range setting unit 230 in place of the neighborhood range setting unit 210 illustrated in FIG. 4.

The neighborhood range setting unit 230 includes an abnormal-region-information acquiring unit 231 which acquires the abnormal region information. The neighborhood range setting unit 230 adaptively sets a time-series neighborhood range with respect to each abnormal image in accordance with the abnormal region information acquired by the abnormal-region-information acquiring unit 231. In the present modification 2-1, the abnormal-region-information acquiring unit 231 includes an intermittent abnormality determination unit (intermittency determination unit) 231a which determines, among the above-mentioned various abnormal regions, whether abnormal regions are the intermittent abnormal regions such as redness, bleeding point, and ulcer. The abnormal-region-information acquiring unit 231 acquires, as abnormal region information, a determination result obtained by the intermittent abnormality determination unit 231a, namely, a result indicating whether the abnormal regions are the intermittent abnormal regions.

Next, operations of the image processing apparatus according to the modification 2-1 will be described. The operations of the image processing apparatus according to the modification 2-1 are similar in whole to FIG. 2 referred to in the first embodiment, except that the operation of setting the time-series neighborhood range in step S12 is different from that of the first embodiment.

Figure 8:
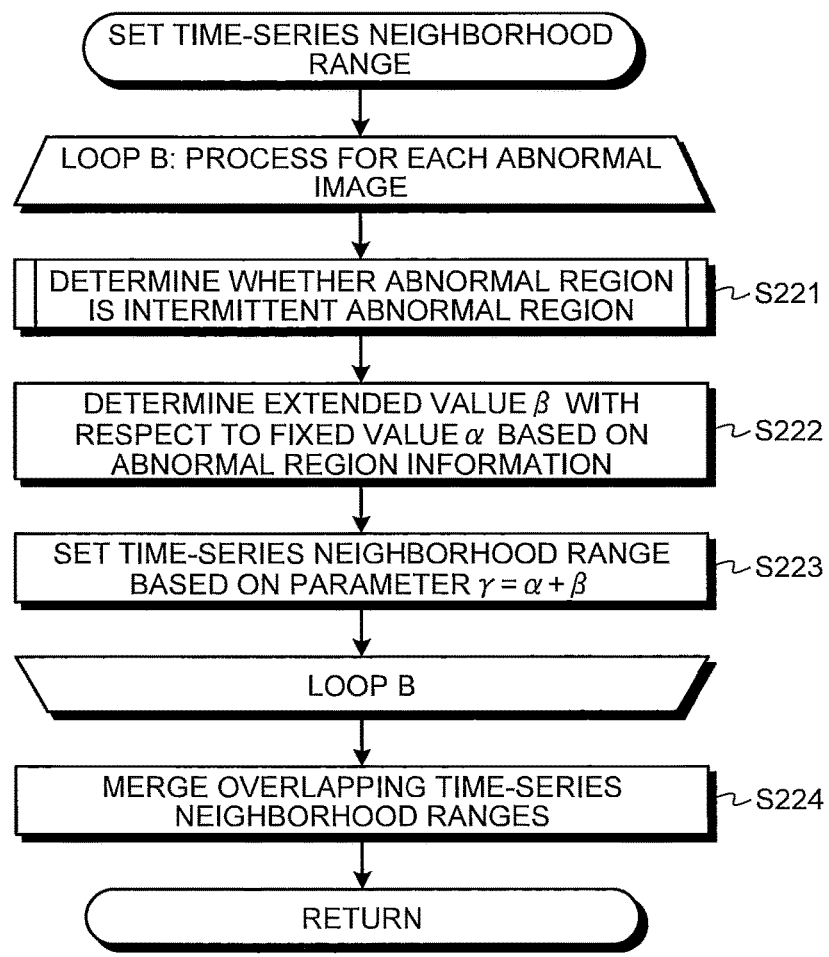
FIG. 8 is a flowchart illustrating an operation of setting a time-series neighborhood range carried out by a neighborhood range setting unit illustrated in FIG. 7.

FIG. 8 is a flowchart illustrating an operation of setting the time-series neighborhood range carried out by the neighborhood range setting unit 230 in step S12 illustrated in FIG. 2. The neighborhood range setting unit 230 carries out a process of loop B in regard to each abnormal image extracted from the series of the intraluminal images (see step S11).

First, in step S221, the intermittent abnormality determination unit 231a determines whether abnormal regions included in abnormal images are the intermittent abnormal regions such as redness, bleeding point, and ulcer. Herein, the redness indicates a state where the mucosa is inflamed and red spots partially appear thereon. The bleeding point indicates a state where a few blood is bleeding from the mucosa, but a bleeding source of the blood is local. The ulcer indicates a state where the mucosa is inflamed and is locally rough. In the ulcer, an inflammation portion such as a white coat and black coat may appear on the center of roughness of the mucosa. Note that the modification 2-1 does not include an ulcer widely spreading over the mucosa as similar to a longitudinal ulcer.

Figure 9:
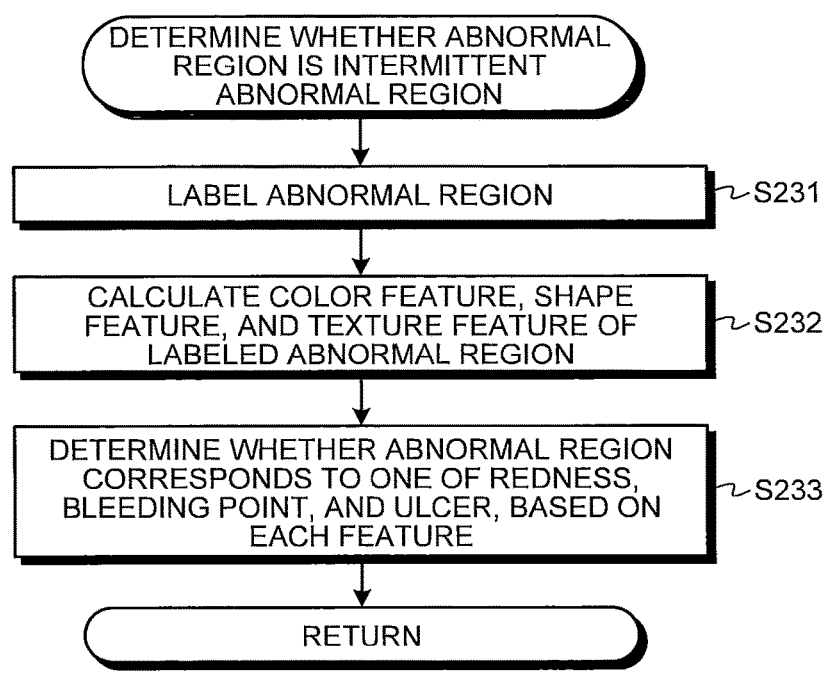
FIG. 9 is a flowchart illustrating a process of determining an intermittent abnormal region carried out by an intermittent abnormality determination unit illustrated in FIG. 7.

FIG. 9 is a flowchart illustrating a process of determining the intermittent abnormal regions carried out by the intermittent abnormality determination unit 231a. In step S231 illustrated in FIG. 9, the intermittent abnormality determination unit 231a carries out labeling with respect to the abnormal region in the abnormal image.

In next step S232, the intermittent abnormality determination unit 231a calculates a color feature, shape feature, and texture feature of the labeled abnormal region. Herein, the redness has a reddish color, a comparatively small area, and a smooth texture. The bleeding point has a reddish color, a comparatively small area, a shape in which a slight bleeding portion is stretching from a circular shape, and a smooth texture. The ulcer has color characteristics of white in the white coat or black in the black coat in addition to red. The ulcer has a comparatively small area, and a double-circular-shape with a small circular shape and a large circular shape. The small circular shape is in a central part and indicates the white coat or the black coat, whereas the large circular shape indicates the inflammation portion of the mucosa. The white coat or the black coat in the central part has a smooth texture, while the inflammation portion around the central part has a harsh texture.

With respect to each abnormal region, the intermittent abnormality determination unit 231a calculates the color feature, shape feature, and texture feature which numerically express each of these colors, shapes, and textures. Details of the color features, shape features, and texture features are similar to those in the second embodiment. Among the color features, note that a color feature indicating an achromatic color is an index indicating a presence of the white coat or the black coat. Since each intermittent abnormal region is locally included in the lumen, it is efficient to use the shape features such as areas, circularity, and Feret's diameter. Furthermore, with regard to the ulcer, inflammation causes a change in the color of the mucosa, and in a structural point of view, the inflammation causes conspicuous unevenness compared to a normal mucosa. Therefore, it is efficient to use the texture feature such as LBP.

In next step S233, the intermittent abnormality determination unit 231a determines, based on each feature, whether the abnormal region corresponds to one of the redness, bleeding point, and ulcer. This determination method is similar to that in the second embodiment (see step S213 in FIG. 6). Thereafter, the operation of the neighborhood range setting unit 230 returns to a main routine.

In step S222 after step S221, the neighborhood range setting unit 230 acquires a determination result of the abnormal region in step S221 as the abnormal region information. Based on the abnormal region information, the neighborhood range setting unit 230 determines an extended value $\beta$ with respect to a fixed value $\alpha$ in a parameter $\gamma$. In the modification 2-1, the fixed value $\alpha$ and the extended value $\beta$ are set such that the parameter $\gamma$, which is the sum of those values, is not less than 2.

As a result of the determination in step S221, when the abnormal regions are not determined to be the intermittent abnormal regions, the neighborhood range setting unit 230 sets the extended value $\beta=\beta_3$. If the parameter $\gamma$ can be eventually set to 2 or more, note that the extended value $\beta_3$ may be set to zero depending on the value of the fixed value $\alpha$.

On the other hand, when the determination result of the abnormal regions in step S221 is the intermittent abnormal regions, the neighborhood range setting unit 230 sets a value smaller than the extended value $\beta_3$ for the extended value $\beta=\beta_4$. The reason for this is as follows: since the intermittent abnormal regions are locally located in the lumen, even in a case where the intermittent abnormal regions are detected from the intraluminal image groups, a possibility that images showing identical intermittent abnormal regions exist over a wide range is lower than in a case where the abnormal regions are not the intermittent abnormal regions. In this case, the extended value $\beta_4$ may be changed in accordance with the types of the abnormal regions (redness, bleeding point, ulcer) or may be uniformed. If the parameter $\gamma$ can be eventually set to 2 or more, note that the extended value $\beta_4$ may be set to the negative value depending on the value of the fixed value $\alpha$.

In next step S223, the neighborhood range setting unit 230 sets the time-series neighborhood range based on the parameter $\gamma=\alpha+\beta$. In other words, the parameter $\gamma$ is calculated with the extended value $\beta$ determined in accordance with types of an abnormal region included in an abnormal image to be processed. Then, the intraluminal images within $\pm\gamma$ range in which the abnormal image is centered are set as one time-series neighborhood range.

The process of the loop B is carried out with respect to all abnormal images extracted from the series of the intraluminal images. Thereafter, in next step S224, when some parts of time-series neighborhood ranges set on abnormal images different from each other are overlapping, the neighborhood range setting unit 230 merges the overlapping time-series neighborhood ranges so as to set them as one time-series neighborhood range. Thereafter, the operations of the calculation unit 220 return to a main routine.

As described above, according to the modification 2-1 of the second embodiment of the present invention, in a case where abnormal regions are the intermittent abnormal regions such as redness, bleeding point, and ulcer, each time-series neighborhood range can be set much narrower than in a case where the abnormal regions are not the intermittent abnormal regions. Accordingly, in a case where abnormal regions are intermittently detected from the intraluminal image groups, abnormal images including the abnormal regions different from one another can be grouped in different abnormal image groups. Therefore, representative images can be extracted properly.

In the modification 2-1, the parameter $\gamma$ is calculated as the sum of the fixed value $\alpha$ and the extended value $\beta$. However, note that a coefficient $\beta'$ or a multiplier $\beta''$ may be determined in place of the extended value $\beta$ based on the abnormal region information and the parameter $\gamma$ may be calculated as $\gamma=\alpha\times\beta'$ or $\gamma=\alpha^{\beta'}$ in step S223. In this case, when the abnormal regions are the intermittent abnormal regions, the coefficient $\beta'$ or the multiplier $\beta''$ is set to be smaller than in a case where the abnormal regions are not the intermittent abnormal regions.

Alternatively, an average value of the number of the abnormal images that include the intermittent abnormal regions and are continuous in the intraluminal images (hereinafter referred to as average continuous number) may be acquired in advance, and types and the average continuous number of the intermittent abnormal regions may be stored in a table and recorded in the recording unit 50 in advance. In this case, the neighborhood range setting unit 230 may read out the table from the recording unit 50 and extract the average continuous number in accordance with the determination results in step S221 and set the average continuous number as the time-series neighborhood range.

Modification 2-2

Figure 10:
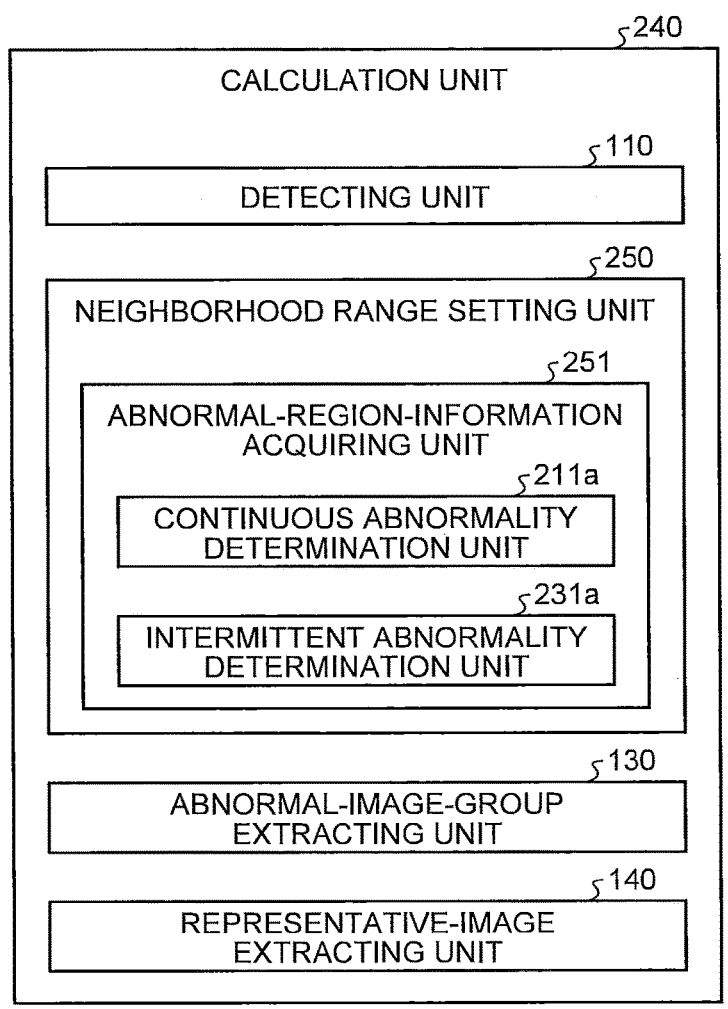
FIG. 10 is a block diagram illustrating a configuration of a calculation unit included in an image processing apparatus according to a modification 2-2 of the second embodiment of the present invention.

Next, a modification 2-2 of the second embodiment of the present invention will be described. FIG. 10 is a block diagram illustrating a configuration of a calculation unit included in an image processing apparatus according to the modification 2-2 of the second embodiment of the present invention. As illustrated in FIG. 10, a calculation unit 240 in the modification 2-2 includes a neighborhood range setting unit 250 in place of the neighborhood range setting unit 210 illustrated in FIG. 4.

The neighborhood range setting unit 250 includes an abnormal-region-information acquiring unit 251 which acquires the abnormal region information. The neighborhood range setting unit 250 adaptively sets a time-series neighborhood range with respect to each abnormal image in accordance with the abnormal region information acquired by the abnormal-region-information acquiring unit 251. In the modification 2-2, the abnormal-region-information acquiring unit 251 includes a continuous abnormality determination unit 211a and an intermittent abnormality determination unit 231a. The continuous abnormality determination unit 211a determines whether an abnormal region is the continuous abnormal region such as bleeding, mucosal abnormality, and vascular abnormality. The intermittent abnormality determination unit 231a determines whether abnormal regions are the intermittent abnormal regions such as redness, bleeding point, and ulcer. The abnormal-region-information acquiring unit 251 acquires, as abnormal region information, a classification result of the abnormal region based on determination results of the continuous abnormality determination unit 211a and the intermittent abnormality determination unit 231a. Note that an operation of the continuous abnormality determination unit 211a is similar to that in the second embodiment, and the operation of the intermittent abnormality determination unit 231a is similar to that in the modification 2-1.

Next, operations of the image processing apparatus according to the modification 2-2 will be described. The operations of the image processing apparatus according to the modification 2-2 are similar in whole to FIG. 2 referred to in the first embodiment, except that the operation of setting the time-series neighborhood range in step S12 is different from that of the first embodiment.

Figure 11:
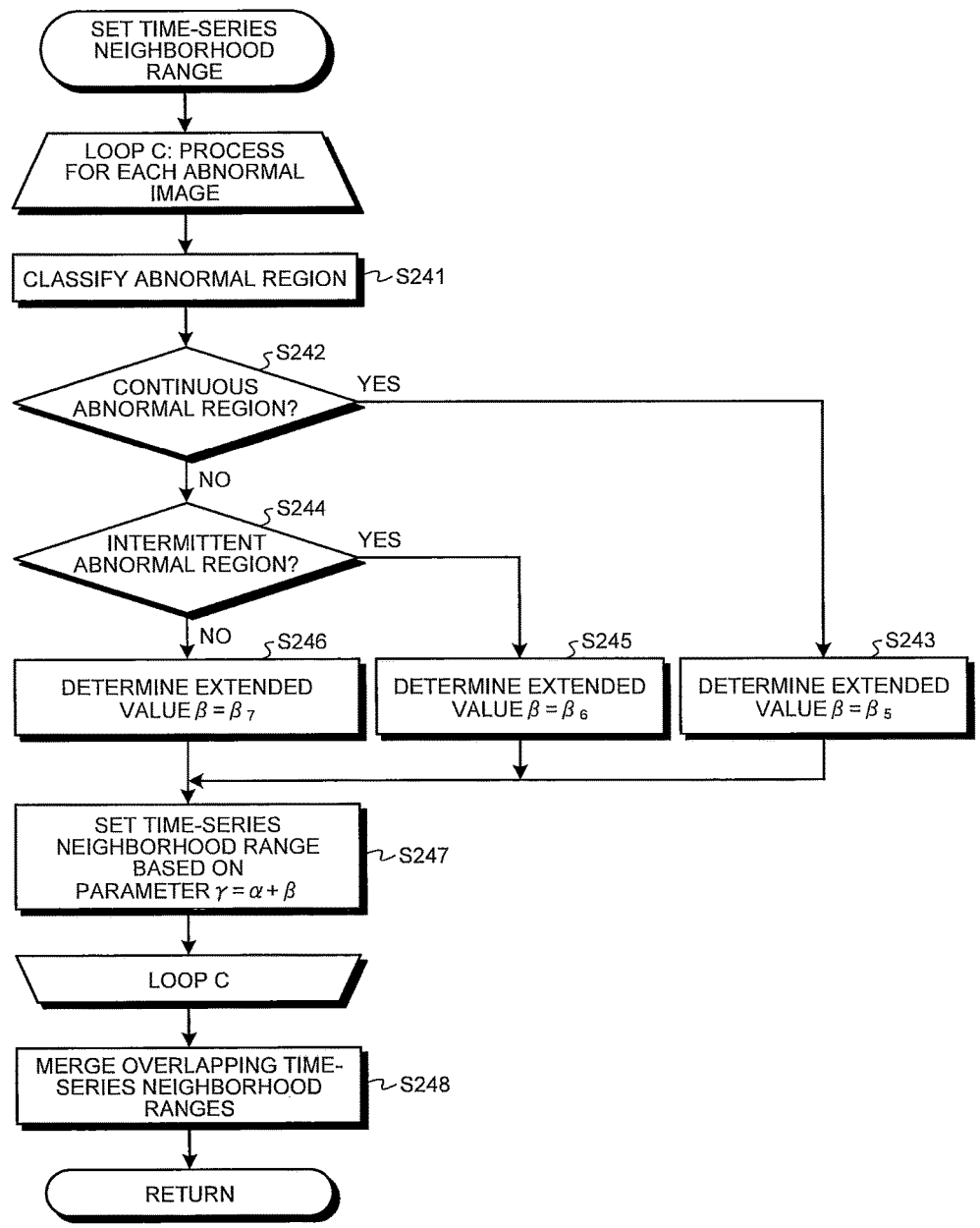
FIG. 11 is a flowchart illustrating an operation of setting a time-series neighborhood range carried out by a neighborhood range setting unit illustrated in FIG. 10.

FIG. 11 is a flowchart illustrating an operation of setting the time-series neighborhood range carried out by the neighborhood range setting unit 250 in step S12 illustrated in FIG. 2. The neighborhood range setting unit 250 carries out a process of loop C in regard to each abnormal image extracted from a series of intraluminal images (see step S11).

First, in step S241, the abnormal-region-information acquiring unit 251 classifies abnormal regions included in abnormal images into the continuous abnormal regions, the intermittent abnormal regions, and the other abnormal regions. Specifically, the continuous abnormality determination unit 211a determines whether the abnormal regions are the continuous abnormal regions, whereas the intermittent abnormality determination unit 231a determines whether the abnormal regions are the intermittent abnormal regions.

In next step S242, the neighborhood range setting unit 250 determines whether the abnormal region is the continuous abnormal region based on a classification result of step S241. In a case where the abnormal region is the continuous abnormal region (step S242: Yes), the neighborhood range setting unit 250 determines an extended value $\beta=\beta_5$ ($\beta_5>0$) with respect to a fixed value $\alpha$ in a parameter $\gamma$ (step S243). Thereafter, the operation of the neighborhood range setting unit 250 proceeds to step S247.

On the other hand, in a case where the abnormal regions are not the continuous abnormal regions (step S242: No), the neighborhood range setting unit 250 successively determines whether the abnormal regions are the intermittent abnormal regions (step S244). In a case where the abnormal regions are the intermittent abnormal regions (step S244: Yes), the neighborhood range setting unit 250 determines the extended value $\beta=\beta_6$ with respect to the fixed value $\alpha$ in the parameter $\gamma$ (step S245). Herein, the extended value $\beta_6$ is set to be a value smaller than the extended value $\beta_5$ determined in step S243. Thereafter, the operation of the neighborhood range setting unit 250 proceeds to step S247.

On the other hand, in a case where the abnormal regions are not the intermittent abnormal regions (step S244: No), the neighborhood range setting unit 250 determines the extended value $\beta=\beta_7$ with respect to the fixed value $\alpha$ in the parameter $\gamma$ (step S246). Herein, the extended value $\beta_7$ is set to be a value smaller than the extended value $\beta_5$ determined in step S243 and larger than the extended value $\beta_6$ determined in step S245.

Herein, when adding the fixed value $\alpha$ and extended value $\beta$ ($\beta_5$, $\beta_6$, $\beta_7$), as mentioned later, those two values are set to be larger than an interval between the intraluminal images that are continuous in time-series in the series of the intraluminal images, i.e., larger than one image. Furthermore, under this condition, the extended values $\beta_5$, $\beta_6$, $\beta_7$ are determined to satisfy $\beta_5>\beta_7>\beta_6$. Herein, $\beta_5>0$, $\beta_7=0$, $\beta_6<0$ may be applicable, or $\beta_5>\beta_7>\beta_6>0$ may also be applicable.

In next step S247, the neighborhood range setting unit 250 sets the time-series neighborhood range based on the parameter $\gamma=\alpha+\beta$. In other words, the parameter $\gamma$ is calculated with the extended value $\beta$ determined in accordance with types of an abnormal region included in an abnormal image to be processed. Then, the intraluminal images within $\pm\gamma$ range in which the abnormal image is centered are set as one time-series neighborhood range.

The process of the loop C is carried out with respect to all abnormal images extracted from the series of the intraluminal images. Thereafter, in next step S248, when some parts of time-series neighborhood ranges set on abnormal images different from each other are overlapping, the neighborhood range setting unit 250 merges the overlapping time-series neighborhood ranges so as to set them as one time-series neighborhood range. Thereafter, the operations of the calculation unit 240 return to a main routine.

As described above, according to the modification 2-2 of the second embodiment of the present invention, the parameter $\gamma$ can be adaptively determined in accordance with the classification result indicating whether abnormal regions are the continuous abnormal regions or the intermittent abnormal regions, or neither of them. As a result, abnormal images including identical abnormal regions can be properly grouped in accordance with types of the abnormal regions. Therefore, representative images can be extracted properly.

Note that in the modification 2-2, abnormal region may be classified into either the continuous abnormal regions or intermittent abnormal regions by adjusting a threshold of the classification index P(x) which is used for determining each of the continuous abnormal regions and intermittent abnormal regions.

Third Embodiment

Figure 12:
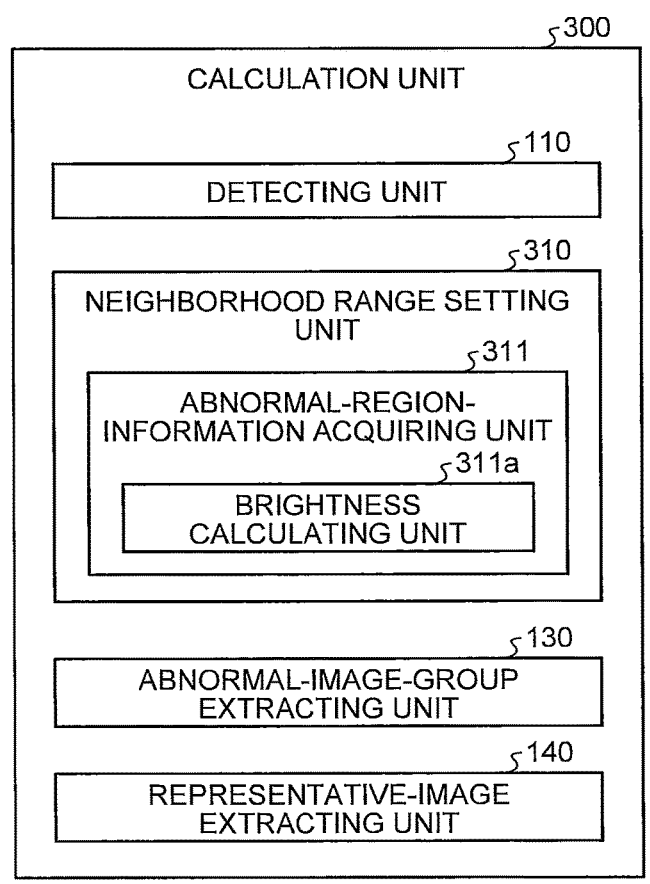
FIG. 12 is a block diagram illustrating a configuration of a calculation unit included in an image processing apparatus according to a third embodiment of the present invention.

Next, a third embodiment of the present invention will be described. FIG. 12 is a block diagram illustrating a configuration of a calculation unit of an image processing apparatus according to the third embodiment of the present invention. As illustrated in FIG. 12, the image processing apparatus according to the third embodiment includes a calculation unit 300 in place of the calculation unit 100 illustrated in FIG. 1. The calculation unit 300 includes a neighborhood range setting unit 310 in place of the neighborhood range setting unit 120 illustrated in FIG. 1. An operation of each unit in the calculation unit 300 except for the neighborhood range setting unit 310, and the configuration and the operation of each unit in the image processing apparatus except for the calculation unit 300 are similar to those in the first embodiment.

The neighborhood range setting unit 310 includes an abnormal-region-information acquiring unit 311 which acquires abnormal region information. The neighborhood range setting unit 310 adaptively sets a time-series neighborhood range within a range wider than an interval between intraluminal images that are continuous in time-series in a series of intraluminal images in accordance with the abnormal region information acquired by the abnormal-region-information acquiring unit 311.

In the third embodiment, the abnormal-region-information acquiring unit 311 includes a brightness calculating unit 311a which calculates brightness of an abnormal region and acquires, as the abnormal region information, the brightness of the abnormal region calculated by the brightness calculating unit 311a.

Next, operations of the image processing apparatus according to the third embodiment will be described. The operations of the image processing apparatus according to the third embodiment are similar in whole to FIG. 2 referred to in the first embodiment, except that the operation of setting the time-series neighborhood range in step S12 is different from that of the first embodiment.

Figure 13:
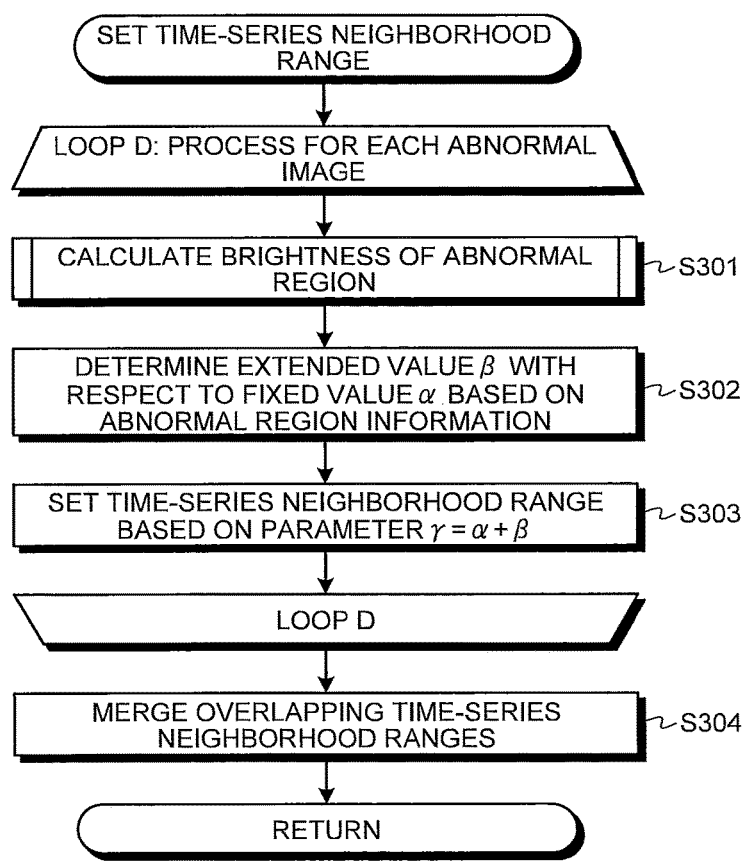
FIG. 13 is a flowchart illustrating an operation of setting a time-series neighborhood range carried out by a neighborhood range setting unit illustrated in FIG. 12.

FIG. 13 is a flowchart illustrating an operation of setting the time-series neighborhood range carried out by the neighborhood range setting unit 310 in step S12 illustrated in FIG. 2. The neighborhood range setting unit 310 carries out a process of loop D in regard to each abnormal image extracted from the series of the intraluminal images (see step S11).

Figure 14:
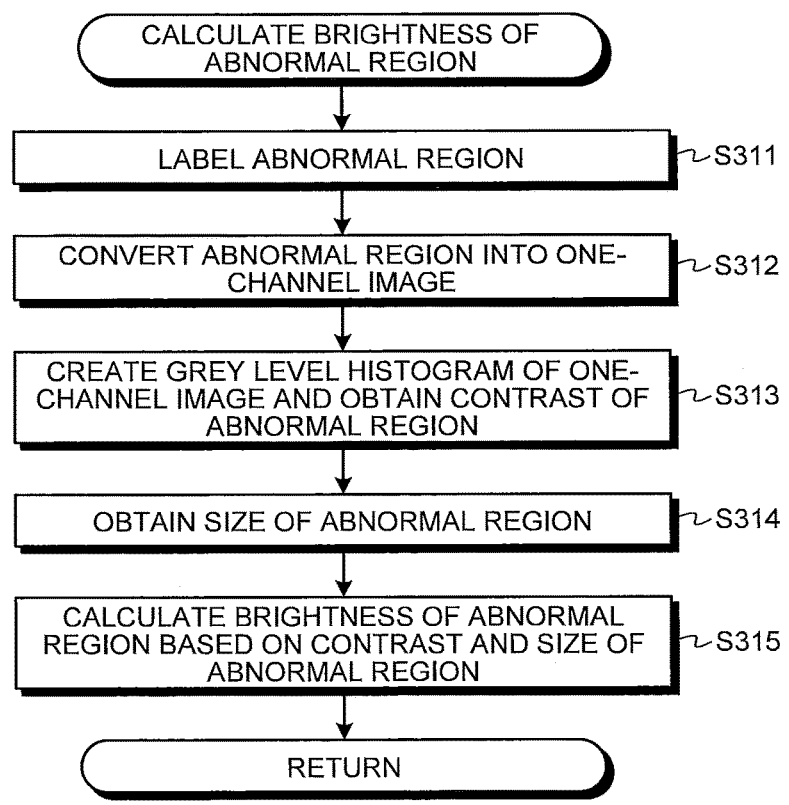
FIG. 14 is a flowchart illustrating a process of calculating brightness carried out by a brightness calculating unit illustrated in FIG. 12.

First, in step S301, the brightness calculating unit 311a calculates brightness of an abnormal region included in an abnormal image. FIG. 14 is a flowchart illustrating a process of calculating the brightness carried out by the brightness calculating unit 311a. In step S311 illustrated in FIG. 14, the brightness calculating unit 311a carries out labeling with respect to the abnormal region in the abnormal image.

In next step S312, the brightness calculating unit 311a converts the abnormal image into a one-channel image. The one-channel image may have any components as pixel values. Specifically, the one-channel image is generated such that the pixel values correspond to any one of R component, G component, and B component of a pixel value of each pixel constituting the abnormal image, a color ratio of G/R or B/G, and luminance obtained by adding the R component, G component, and B component with a specific ratio.

In next step S313, the brightness calculating unit 311a creates a grey level histogram of the one-channel image generated in step S312, and obtains contrast of the abnormal region labeled in step S311 based on the grey level histogram. The contrast C of each abnormal region is given by the following Formula (3) where the maximum value and the minimum value of the pixel values in each abnormal region are denoted by $L_{max}$ and $L_{min}$, respectively.

$$C=(L_{max}-L_{min})/(L_{max}+L_{min}) \qquad (3)$$

In next step S314, the brightness calculating unit 311a calculates a size (areas) of the abnormal region labeled in step S311, namely, the total number of pixels included in the abnormal region.

In next step S315, the brightness calculating unit 311a calculates the brightness of the abnormal region based on the contrast and size of the abnormal region. Brightness V of each abnormal region is given by the following Formula (4) using the contrast C of the abnormal region, a size S of the abnormal region, and arbitrary coefficients $k_1$ and $k_2$ ($k_1>0$, $k_2>0$).

$$V=k_1 \times C+k_2 \times S \qquad (4)$$

Thereafter, the operation of the neighborhood range setting unit 310 returns to a main routine.

In step S302 after step S301, the neighborhood range setting unit 310 acquires the brightness calculated in step S301 as the abnormal region information. Based on the abnormal region information, the neighborhood range setting unit 310 determines an extended value β with respect to a fixed value α in a parameter γ. In the third embodiment, the extended value β is adaptively determined in accordance with the brightness of the abnormal region. The fixed value α and the extended value β are set such that the parameter γ, which is the sum of those values, is not less than 2.

Herein, in a case where an abnormal region has low brightness, the abnormal region is regarded as a region showing pale or small intraluminal abnormal portions. It is difficult to stably detect such abnormal portions. Therefore, even in the series of the intraluminal images, there is a high possibility of detecting a broken abnormal region. Therefore, in the third embodiment, lower brightness V increases the value of extended value β, whereas higher brightness V decreases the value of the extended value β.

In next step S303, the neighborhood range setting unit 310 sets the time-series neighborhood range based on the parameter γ=α+β. In other words, the parameter γ is calculated with the extended value β determined in accordance with brightness of an abnormal region included in an abnormal image to be processed. Then, the intraluminal images within ±γ range in which the abnormal image is centered are set as one time-series neighborhood range.

The process of the loop D is carried out with respect to all abnormal images extracted from the series of the intraluminal images. Thereafter, in next step S304, when some parts of time-series neighborhood ranges set on abnormal images different from each other are overlapping, the neighborhood range setting unit 310 merges the overlapping time-series neighborhood ranges so as to set them as one time-series neighborhood range. Thereafter, the operations of the calculation unit 300 return to a main routine.

As described above, according to the third embodiment of the present invention, each time-series neighborhood range is set adaptively in accordance with the brightness of each abnormal region in each abnormal image. Therefore, even in a case where the abnormal regions cannot be detected stably, a plurality of abnormal images including identical abnormal regions can be prevented from dispersing into the different abnormal image groups so that the abnormal images can be grouped properly. Accordingly, the abnormal images including the identical abnormal regions can be prevented from being extracted from a plurality of abnormal image groups as representative images so that the representative images can be extracted properly.

In the third embodiment, the contrast of each abnormal region is calculated. However, note that an image with high contrast in whole can also be regarded as an image with excellent brightness. Therefore, the contrast of the whole image may be calculated so as to calculate the brightness based on the contrast.

Furthermore, in the third embodiment, the brightness is calculated based on the contrast and area of each abnormal region. However, either the contrast or area may be used as the brightness.

In the third embodiment, when calculating the parameter γ (see step S303), a coefficient β' or a multiplier β" of the fixed value α may be determined in place of the extended value β to be added to the fixed value α so as to calculate the parameter γ as γ=α×β' or γ=α$^{β"}$. In this case, lower brightness increases the coefficient β' or the multiplier β".

Furthermore, the method for setting the time-series neighborhood range according to the third embodiment may be combined with the method for setting the time-series neighborhood range in the second embodiment or the modifications 2-1 and 2-2. Specifically, each time-series neighborhood range is set in accordance with the classification result of the abnormal regions. If brightness of the abnormal region is high, the time-series neighborhood range may be narrowed, while if the brightness of the abnormal region is low, the time-series neighborhood range may be expanded.

Fourth Embodiment

Figure 15:
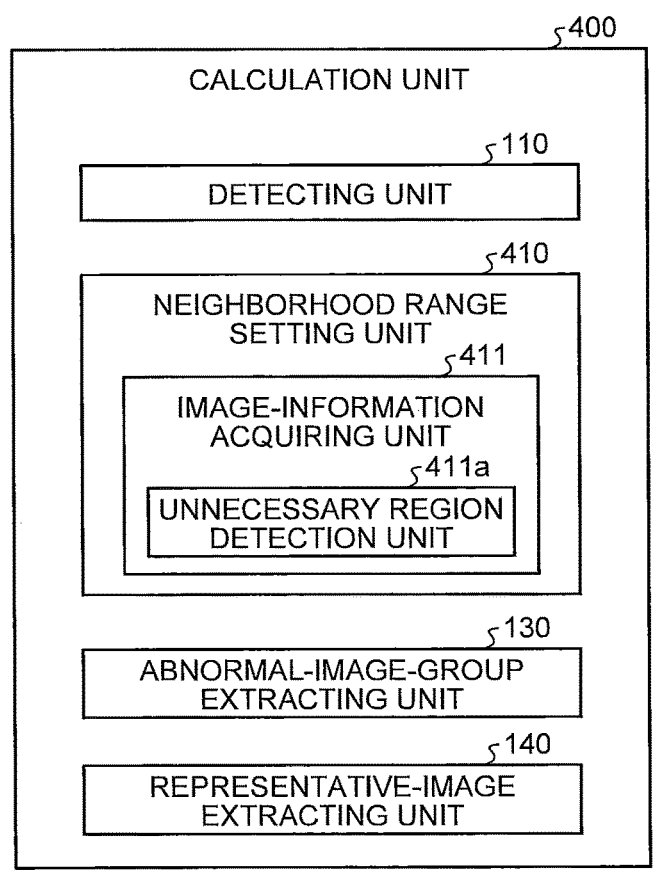
FIG. 15 is a block diagram illustrating a configuration of a calculation unit included in an image processing apparatus according to a fourth embodiment of the present invention.

Next, a fourth embodiment of the present invention will be described. FIG. 15 is a block diagram illustrating a configuration of a calculation unit included in an image processing apparatus according to the fourth embodiment of the present invention. As illustrated in FIG. 15, the image processing apparatus according to the fourth embodiment includes a calculation unit 400 in place of the calculation unit 100 illustrated in FIG. 1. The calculation unit 400 includes a neighborhood range setting unit 410 in place of the neighborhood range setting unit 120 illustrated in FIG. 1. An operation of each unit in the calculation unit 400 except for the neighborhood range setting unit 410, and the configuration and the operation of each unit in the image processing apparatus except for the calculation unit 400 are similar to those in the first embodiment.

The neighborhood range setting unit 410 includes an image-information acquiring unit 411 which acquires image information in regard to each abnormal image. The neighborhood range setting unit 410 adaptively sets a time-series neighborhood range within a range wider than an interval between intraluminal images that are continuous in time-series in a series of intraluminal images in accordance with the image information acquired by the image-information acquiring unit 411.

In the fourth embodiment, the image-information acquiring unit 411 includes an unnecessary region detection unit 411a which detects, from an abnormal image, an unnecessary region that does not correlate with the abnormal region which is an object to be detected, and acquires a detection result of the unnecessary region detected by the unnecessary region detection unit 411a as the image information. The unnecessary region specifically indicates a region showing a bubble, residue, and the like that are unnecessary for examination.

Next, operations of the image processing apparatus according to the fourth embodiment will be described. The operations of the image processing apparatus according to the fourth embodiment are similar in whole to FIG. 2 referred to in the first embodiment, except that the operation of setting the time-series neighborhood range in step S12 is different from that of the first embodiment.

Figure 16:
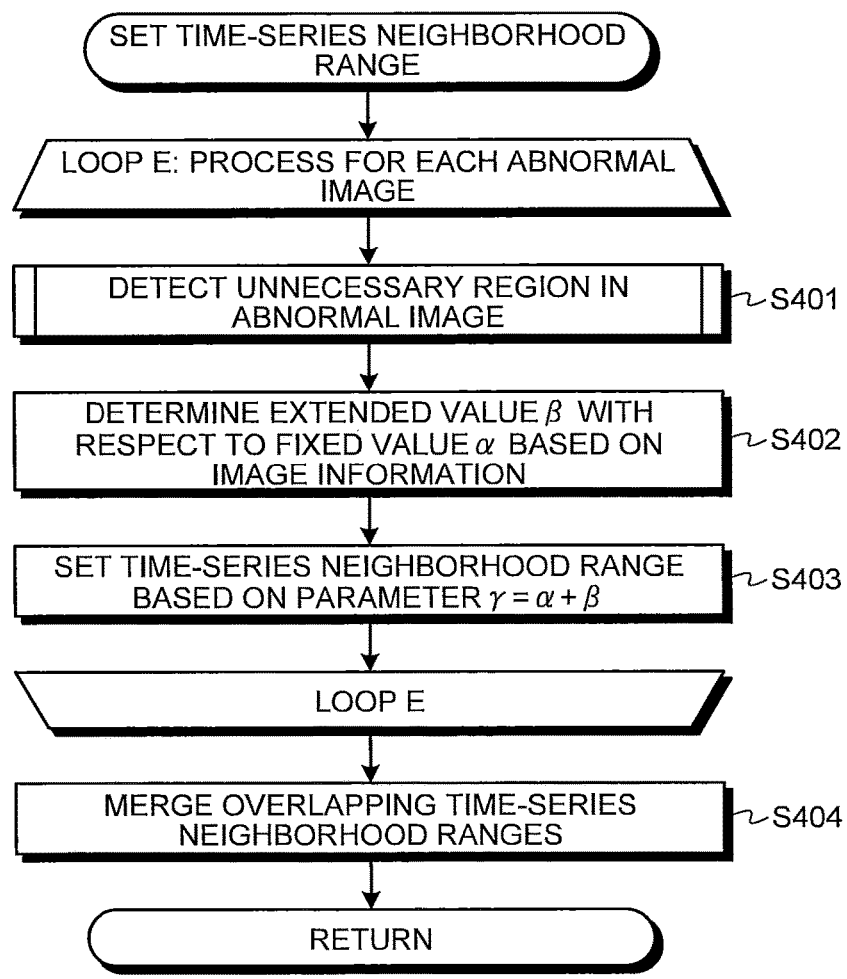
FIG. 16 is a flowchart illustrating an operation of setting a time-series neighborhood range carried out by a neighborhood range setting unit illustrated in FIG. 15.

FIG. 16 is a flowchart illustrating an operation of setting the time-series neighborhood range carried out by the neighborhood range setting unit 410 in step S12 illustrated in FIG. 2. The neighborhood range setting unit 410 carries out a process of loop E in regard to each abnormal image extracted from the series of the intraluminal images (see step S11).

First, in step S401, the unnecessary region detection unit 411a detects an unnecessary region in an abnormal image.

Figure 17:
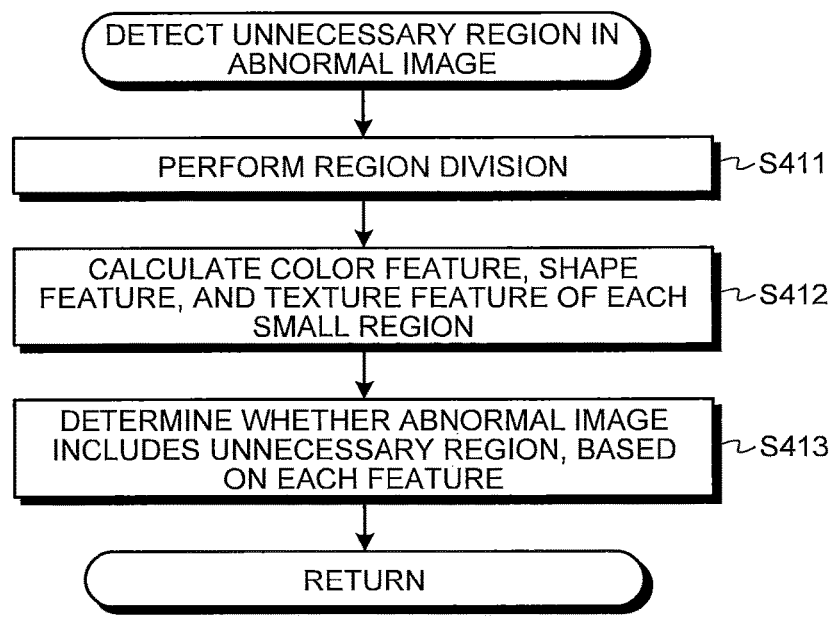
FIG. 17 is a flowchart illustrating a process of detecting an unnecessary region carried out by an unnecessary region detection unit illustrated in FIG. 15.

FIG. 17 is a flowchart illustrating a process of detecting the unnecessary region carried out by the unnecessary region detection unit 411a. In step S411 illustrated in FIG. 17, the unnecessary region detection unit 411a divides the abnormal image into a plurality of small regions. Known methods are applicable for dividing the region. Such examples include a process for dividing a region by merging adjacent pixels in which spatially adjacent pixels having similar features are merged.

In next step S412, the unnecessary region detection unit 411a calculates a color feature, shape feature, and texture feature of each divided small region. A yellow color and a white color specific to the residue are specifically detected as the color feature. Therefore, average values of a color ratio G/R and a color ratio B/G in pixels included in each small region are calculated. Alternatively, a histogram in an HSI color space may be calculated as the color feature. Furthermore, a correlation value between the pixels included in each small region and a bubble model is calculated as the shape features. Herein, the bubble model is set based on characteristics of a bubble image such as arced projection edges, due to illumination reflection, included in a contour of a bubble and in an inner part of the bubble (Reference: JP 2007-313119 A). Furthermore, patterns of the residue are detected as the texture features. Therefore, calculated is the LBP which is strong over illumination change and is capable of capturing a fine structure.

In next step S413, the unnecessary region detection unit 411a determines whether the abnormal image includes any unnecessary region such as bubble and residue, based on each feature of each small region. Specifically, by normalizing each feature and then weighting and merging the same, a characteristic vector x of k×1 matrix is created for a small region to be determined. Using a discriminant function of the unnecessary region created in advance, the unnecessary region is classified. In this case, as shown in the Formula (2), the classification index P(x) is calculated based on the probability model. When the classification index P(x) is not less than a threshold, the small region is determined to be a bubble region or residue region. Thereafter, the operation of the neighborhood range setting unit 410 returns to a main routine.

Note that methods for determining (detecting) the bubble region and residue region should not be limited to the above-mentioned method using the features. Examples of the method for determining the bubble region include a method for detecting each bubble region based on a luminance high frequency feature of each small region (Reference: JP 2010-115260 A), a method for extracting a candidate point of a circular region representing the bubble based on a feature of an inner structure of each bubble region and extracting the circular region corresponding to the bubble region based on information included in the candidate point (Reference: JP 2012-125469 A), a method for extracting a circular or arched region from an image as a bubble candidate region and determining whether the bubble candidate region is the bubble region based on information of a boundary region included in a periphery of the bubble candidate region (Reference: JP 2012-120799 A).

Furthermore, examples of the method for determining the residue region include a method for detecting a candidate region of an abnormal portion based on color information of pixels included in an image and determining each residue region from an abnormal portion region, among pixels in a neighborhood of a boundary of the candidate region, with reference to a feature based on a pixel value of pixels corresponding to a specific wavelength component in accordance with degree of absorption in a living body (Reference: JP 2013-111420 A), a method for determining whether the candidate region is an abnormal portion included in a mucosa or whether the candidate region is a residue floating from the mucosa based on a similarity between shape information of the candidate region of the abnormal portion and shape information of a surrounding region thereof (Reference: JP 2013-223672 A).

In step S402 after step S401, the neighborhood range setting unit 410 acquires, as the image information, the detection result of the unnecessary region detected in step S401, and determines an extended value β with respect to a fixed value α in a parameter γ based on the image information. In the fourth embodiment, the extended value β is adaptively determined in accordance with a quantity of the unnecessary region. The fixed value α and the extended value β are set such that the parameter γ, which is the sum of those values, is not less than 2.

Herein, in a case where an abnormal image includes a large quantity of unnecessary regions such as bubble and residue, the abnormal region may be hidden behind the unnecessary regions so that there is a high possibility that a broken abnormal region may be detected in the series of the intraluminal images. Furthermore, in a case where an abnormal image includes the unnecessary region such as bubble and residue, a state of an image around the abnormal region changes significantly so that detection of the abnormal region itself may be difficult. Therefore, in the fourth embodiment, a larger quantity of the unnecessary regions detected from the abnormal image increases the extended value β, whereas a fewer quantity of the unnecessary region decreases the extended value β. The quantity of the unnecessary region may be determined, for example, by performing threshold processing on occupancy of areas (the number of pixels) of the unnecessary region to areas (the number of pixels) of the abnormal image. Alternatively, the quantity of the unnecessary region can be determined by performing the threshold processing on the number of the unnecessary region detected from the abnormal image.

In next step S403, the neighborhood range setting unit 410 sets the time-series neighborhood range based on the parameter $\gamma=\alpha+\beta$. In other words, the parameter γ is calculated with the extended value β determined in accordance with a quantity of unnecessary region included in an abnormal image to be processed. Then, the intraluminal images within ±γ range in which the abnormal image is centered are set as one time-series neighborhood range.

The process of the loop E is carried out with respect to all abnormal images extracted from the series of the intraluminal images. Thereafter, in next step S404, when some parts of time-series neighborhood ranges set on abnormal images different from each other are overlapping, the neighborhood range setting unit 410 merges the overlapping time-series neighborhood ranges so as to set them as one time-series neighborhood range. Thereafter, the operations of the calculation unit 400 return to a main routine.

As described above, according to the fourth embodiment of the present invention, each time-series neighborhood range is set adaptively in accordance with the quantity of the unnecessary region detected from each abnormal image. Therefore, even in a case where each abnormal region cannot be stably detected due to the unnecessary region, a plurality of abnormal images including identical abnormal regions can be prevented from dispersing into the different abnormal image groups so that the abnormal images can be grouped properly. Accordingly, the abnormal images including the identical abnormal regions can be prevented from being extracted from a plurality of abnormal image groups as representative images so that the representative images can be extracted properly.

In the fourth embodiment, when calculating the parameter γ (see step S403), a coefficient β' or a multiplier β" of the fixed value α may be determined in place of the extended value β to be added to the fixed value α so as to calculate the parameter γ as $\gamma=\alpha\times\beta'$ or $\gamma=\alpha^{\beta''}$. In this case, the larger the quantity of the unnecessary region grows, the more the coefficient β' or the multiplier β" increases.

The method for setting the time-series neighborhood range according to the fourth embodiment may be combined with other methods for setting the time-series neighborhood range of other embodiments. For example, the time-series neighborhood range set in accordance with a classification result of the abnormal regions (see the second embodiment, the modifications 2-1 and 2-2) may be expanded if the quantity of the unnecessary regions is large, and may be narrowed if the quantity of unnecessary region is small. Similarly, the time-series neighborhood range set in accordance with brightness of each abnormal region (see the third embodiment) may be adjusted in accordance with the quantity of the unnecessary region.

Fifth Embodiment

Figure 18:
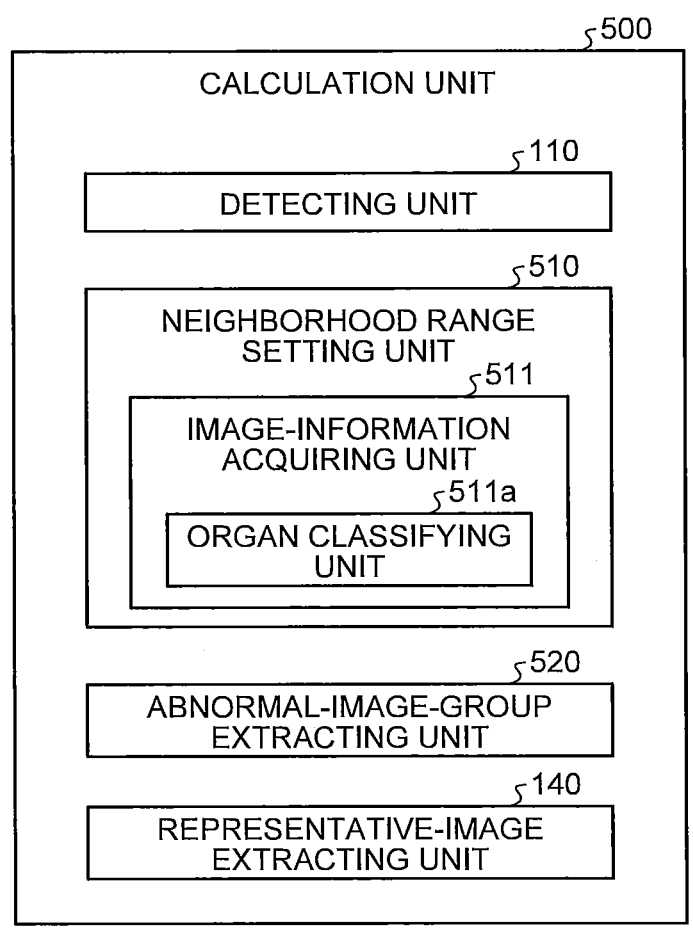
FIG. 18 is a block diagram illustrating a configuration of a calculation unit included in an image processing apparatus according to a fifth embodiment of the present invention.

Next, a fifth embodiment of the present invention will be described. FIG. 18 is a block diagram illustrating a configuration of a calculation unit included in an image processing apparatus according to the fifth embodiment of the present invention. As illustrated in FIG. 18, the image processing apparatus according to the fifth embodiment includes a calculation unit 500 in place of the calculation unit 100 illustrated in FIG. 1. The calculation unit 500 includes a neighborhood range setting unit 510 and an abnormal-image-group extracting unit 520 in place of the neighborhood range setting unit 120 and the abnormal-image-group extracting unit 130 illustrated in FIG. 1. An operation of each unit in the calculation unit 500 except for the neighborhood range setting unit 510 and the abnormal-image-group extracting unit 520, and the configuration and the operation of each unit in the image processing apparatus except for the calculation unit 500 are similar to those in the first embodiment.

The neighborhood range setting unit 510 includes an image-information acquiring unit 511 which acquires image information in regard to each abnormal image. The neighborhood range setting unit 510 adaptively sets a time-series neighborhood range within a range wider than an interval between intraluminal images that are continuous in time-series in a series of intraluminal images in accordance with the image information acquired by the image-information acquiring unit 511. In the fifth embodiment, the image-information acquiring unit 511 includes an organ classifying unit 511a which classifies types of an organ shown in each abnormal image, and acquires, as image information, information indicating the types of the organ (organ information) classified by the organ classifying unit 511a.

The abnormal-image-group extracting unit 520 extracts abnormal image groups each including identical abnormal regions based on each time-series neighborhood range set by the neighborhood range setting unit 510 and based on the image information (organ information) acquired by the image-information acquiring unit 511.

Next, operations of the image processing apparatus according to the fifth embodiment will be described. The operations of the image processing apparatus according to the fifth embodiment are similar in whole to FIG. 2 referred to in the first embodiment, except that the operation of setting the time-series neighborhood range in step S12 and the process of extracting the abnormal image groups in step S13 are different from those of the first embodiment.

Figure 19:
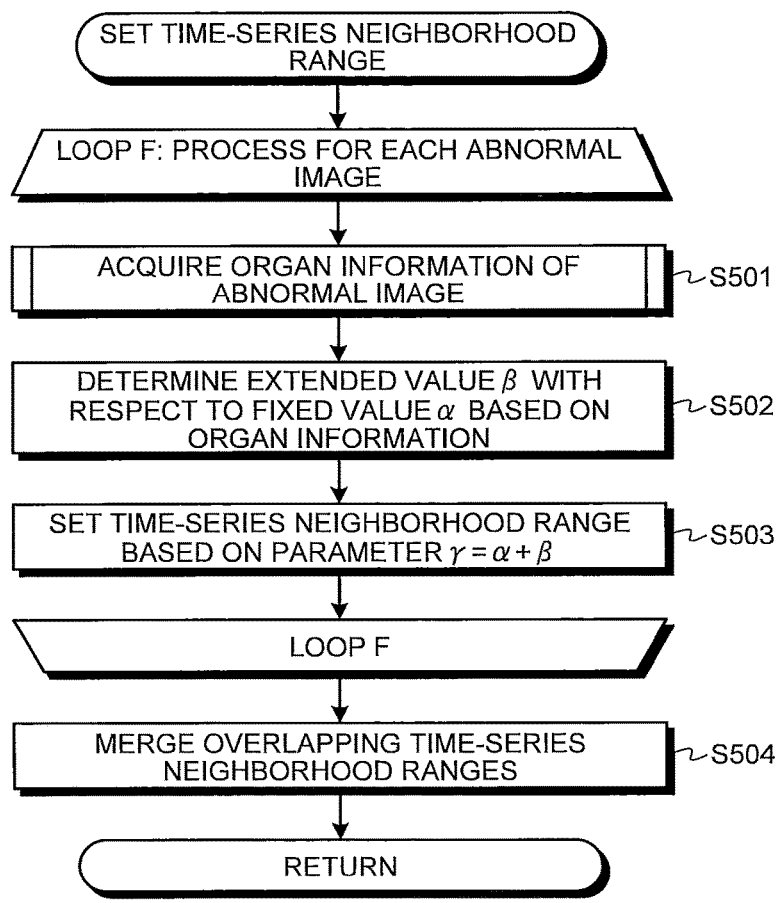
FIG. 19 is a flowchart illustrating an operation of setting a time-series neighborhood range carried out by a neighborhood range setting unit illustrated in FIG. 18.

FIG. 19 is a flowchart illustrating an operation of setting the time-series neighborhood range carried out by the neighborhood range setting unit 510 in step S12 illustrated in FIG. 2. The neighborhood range setting unit 510 carries out a process of loop F in regard to each abnormal image extracted from the series of the intraluminal images (see step S11).

Figure 20:
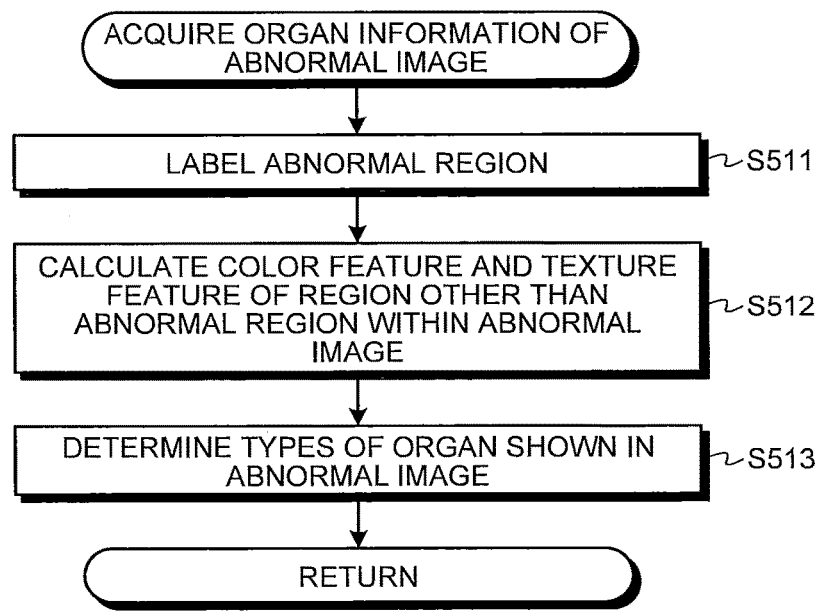
FIG. 20 is a flowchart illustrating a process of acquiring organ information carried out by an organ classifying unit illustrated in FIG. 18.

First, in step S501, the organ classifying unit 511a acquires the organ information as the image information of each abnormal image. Herein, the organ information represents information indicating the types of the organ shown in each abnormal image. FIG. 20 is a flowchart illustrating a process of acquiring the organ information carried out by the organ classifying unit 511a. In step S511 illustrated in FIG. 20, the organ classifying unit 511a carries out labeling with respect to each abnormal region in each abnormal image.

In next step S512, the organ classifying unit 511a calculates a color feature and texture feature of a region other than the labeled abnormal region within each abnormal image. Herein, a mucosa of a stomach has a characteristic of an intense red color compared to mucosa of other organs. Furthermore, a small intestine has a characteristic that patterns of folds of villi are observable. A large intestine contains a large quantity of residues. Therefore, a color or pattern on a surface of a mucosa, a quantity of the residues, and the like in the large intestine are different from other organs. Therefore, the color feature and texture feature of the region other than the abnormal region within each abnormal image will be indexes which are efficient for determining the types of the organ shown in each abnormal image.

Specifically, as the color feature of the region other than the abnormal region, an average value of a color ratio G/R or a color ratio B/G in pixels constituting the region is calculated. Alternatively, a histogram in an HSI color space may be calculated as the color feature. Furthermore, patterns of the residue are detected as the texture features. Therefore, calculated is the LBP which is strong over illumination change and is capable of capturing a fine structure.

In next step S513, the organ classifying unit 511a determines the types of the organ shown in each abnormal image based on each feature of the region other than the abnormal region. Specifically, by normalizing each feature and then weighting and merging the same, a characteristic vector x of k×1 matrix is created for the region other than the abnormal region. Using a discriminant function of various organs which has been made in advance, an organ corresponding to the region is determined. In this case, the classification index P(x) based on the probability model shown in the Formula (2) is calculated per type of the organ. When the classification index P(x) is not less than the threshold, the types are determined to be that organ. The types of the organ determined herein is the organ information of the abnormal image. Thereafter, the operation of the neighborhood range setting unit 510 returns to a main routine.

Note that a method for classifying the types of the organ should not be limited to the above-mentioned method using features. For example, the types of the organ may be determined based on frequency component information of each abnormal image (Reference: JP 2008-278963 A). Alternatively, the types of the organ may be determined by users. Specifically, an average color of each of the series of intraluminal images is calculated by image processing of the calculation unit 500, and a color bar arranging the average color of each intraluminal image in an arrangement order (time-series order) is created so as to be displayed on the display unit 40. A change (boundary) of the average color on the color bar corresponds to a boundary of the organ in the series of the intraluminal images. Therefore, when signals selecting a specific point on the color bar are inputted from the input unit 30 to the control unit 10 in accordance with the user's operation with respect to the input unit 30, the control unit 10 inputs, into the calculation unit 500, an image number of an intraluminal image corresponding to the point. The calculation unit 500 specifies the types of the organ shown in each intraluminal image as regarding the intraluminal image corresponding to the inputted image number as the boundary of the organ.

In next step S502, the neighborhood range setting unit 510 determines an extended value β with respect to a fixed value α in a parameter γ based on the organ information acquired as the image information in step S501. In the fifth embodiment, the extended value β is adaptively determined in accordance with the types of the organ. The fixed value α and the extended value β are set such that the parameter γ, which is the sum of those values, is not less than 2.

Herein, in a case where an organ to be examined has been determined (for example, in a case where the small intestine is set to be the object to be examined), the users may have needs to extract a larger quantity of representative images in regard to the organ to be examined (for example, the small intestine) and needs to extract a smaller quantity of the representative images in regard to organs (for example, the stomach or large intestine) other than the organ to be examined. Alternatively, in regard to an organ with peristaltic movement intensified by being subjected to a predetermined previous process, there are needs to extract a larger quantity of the representative images due to high passage speed of a capsule endoscope.

Therefore, in the fifth embodiment, each time-series neighborhood range is set based on the organ information. Specifically, the neighborhood range setting unit 510 relatively decreases the extended value β which is set with respect to each abnormal image including the organ to be examined so as to extract more abnormal image groups. On the other hand, the neighborhood range setting unit 510 relatively increases the extended value β which is set with respect to each abnormal image including the organs other than the organ to be examined so as to reduce the number of the abnormal image groups to be extracted. Alternatively, the more the peristaltic movement of the organ shown in each abnormal image is intensified, the smaller the extended value β may be set.

In next step S503, the neighborhood range setting unit 510 sets the time-series neighborhood range based on the parameter γ=α+β. In other words, the parameter γ is calculated with the extended value β determined in accordance with types of an organ shown in an abnormal image to be processed. Then, the intraluminal images within ±γ range in which the abnormal image is centered are set as one time-series neighborhood range.

The process of the loop F is carried out with respect to all abnormal images extracted from the series of the intraluminal images. Thereafter, in next step S504, when some parts of time-series neighborhood ranges set on abnormal images different from each other are overlapping, the neighborhood range setting unit 510 merges the overlapping time-series neighborhood ranges so as to set them as one time-series neighborhood range. Thereafter, the operations of the calculation unit 500 return to a main routine.

In step S13 after step S12 (see FIG. 2), the abnormal-image-group extracting unit 520 extracts the abnormal image groups each including the identical abnormal regions based on each time-series neighborhood range set in step S12 and the organ information acquired in step S501. Specifically, the abnormal-image-group extracting unit 520 sets the abnormal images included in one time-series neighborhood range as one abnormal image group including the identical abnormal regions. In this case, when a time-series neighborhood range is set over different organs, abnormal images including different abnormal regions included in the different organs may be extracted as an identical abnormal image group. Therefore, the representative images may not be extracted properly. Therefore, in the fifth embodiment, the abnormal-image-group extracting unit 520 further searches the time-series neighborhood range of each abnormal image or the merged time-series neighborhood range, based on the organ information of each abnormal image. The abnormal-image-group extracting unit 520 then cuts the time-series neighborhood range at a part where the types of organs shown in the abnormal images are changed. Accordingly, the abnormal images showing different types of organs do not fall within one time-series neighborhood range.

As described above, according to the fifth embodiment of the present invention, the types of the organ shown in each abnormal image is classified, and each time-series neighborhood range is adaptively set in accordance with the types of the organ. Furthermore, each time-series neighborhood range is set such that the abnormal images with different types of organs may not fall within one time-series neighborhood range. Therefore, the representative images can be extracted properly in accordance with objects of examination and conditions of the organs.

In the fifth embodiment, when calculating the parameter $\gamma$ (see step S503), a coefficient $\beta'$ or a multiplier $\beta''$ of the fixed value $\alpha$ may be determined in place of the extended value $\beta$ to be added to the fixed value $\alpha$ so as to calculate the parameter $\gamma$ as $\gamma=\alpha\times\beta'$ or $\gamma=\alpha^{\beta''}$. In this case, the coefficient $\beta'$ or the multiplier $\beta''$ is determined in accordance with the types of the organ.

The method for setting the time-series neighborhood range according to the fifth embodiment may be combined with other methods for setting the time-series neighborhood range of other embodiments. For example, the time-series neighborhood range set in accordance with a classification result of the abnormal regions (see the second embodiment, and the modifications 2-1 and 2-2) may be expanded or narrowed in accordance with the types of the organ shown in the abnormal images. Similarly, the time-series neighborhood range set in accordance with brightness of each abnormal region (see the third embodiment) or a quantity of unnecessary region (see the fourth embodiment) may be adjusted in accordance with the types of the organ.

Sixth Embodiment

Figure 21:
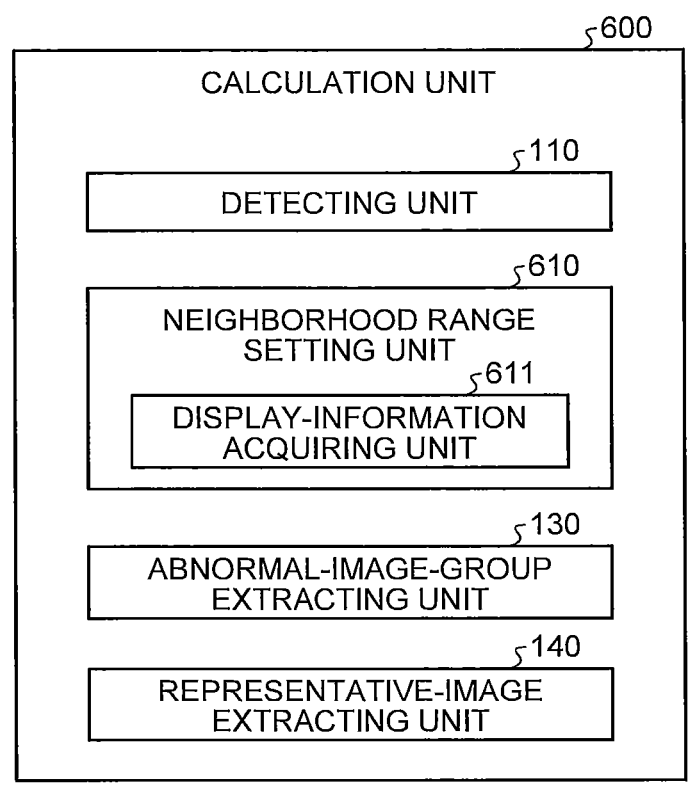
FIG. 21 is a block diagram illustrating a configuration of a calculation unit included in an image processing apparatus according to a sixth embodiment of the present invention.

Next, a sixth embodiment of the present invention will be described. FIG. 21 is a block diagram illustrating a configuration of a calculation unit included in an image processing apparatus according to the sixth embodiment of the present invention. As illustrated in FIG. 21, the image processing apparatus according to the sixth embodiment includes a calculation unit 600 in place of the calculation unit 100 illustrated in FIG. 1. The calculation unit 600 includes a neighborhood range setting unit 610 in place of the neighborhood range setting unit 120 illustrated in FIG. 1. An operation of each unit in the calculation unit 600 except for the neighborhood range setting unit 610, and the configuration and the operation of each unit in the image processing apparatus except for the calculation unit 600 are similar to those in the first embodiment.

The neighborhood range setting unit 610 includes a display-information acquiring unit 611 which acquires display information representing a method for displaying representative images (moving-image display or still-image display) set in the image processing apparatus. The neighborhood range setting unit 610 adaptively sets a time-series neighborhood range within a range wider than an interval between intraluminal images that are continuous in time-series in a series of intraluminal images in accordance with the display information acquired by the display-information acquiring unit 611.

Next, operations of the image processing apparatus according to the sixth embodiment will be described. The operations of the image processing apparatus according to the sixth embodiment are similar in whole to FIG. 2 referred to in the first embodiment, except that the operation of setting the time-series neighborhood range in step S12 is different from that of the first embodiment.

Figure 22:
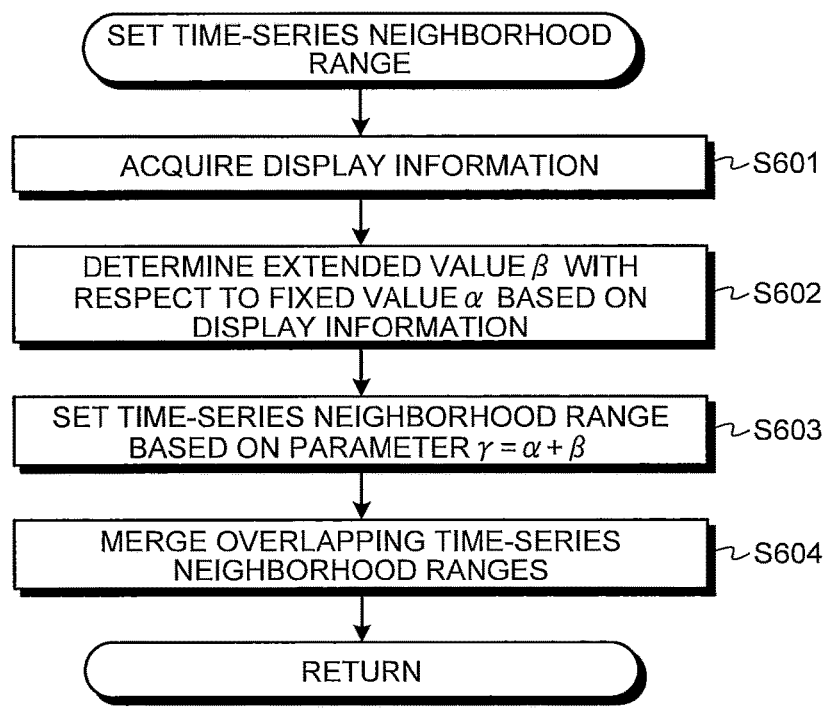
FIG. 22 is a flowchart illustrating an operation of setting a time-series neighborhood range carried out by a neighborhood range setting unit illustrated in FIG. 21.

FIG. 22 is a flowchart illustrating an operation of setting the time-series neighborhood range carried out by the neighborhood range setting unit 610 in step S12 illustrated in FIG. 2.

When signals indicating the method for displaying the representative images are inputted from the input unit 30 to the control unit 10 in accordance with user's operations with respect to the input unit 30, the control unit 10 sets the method for displaying the representative images according to the signals. In step S601, the display-information acquiring unit 611 acquires the display information indicating the display method set by the control unit 10.

In next step S602, the neighborhood range setting unit 610 determines an extended value $\beta$ with respect to a fixed value $\alpha$ in a parameter $\gamma$ based on the display information acquired in step S601. In the sixth embodiment, the extended value $\beta$ is adaptively determined in accordance with the method for displaying the representative image. The fixed value $\alpha$ and the extended value $\beta$ are set such that the parameter $\gamma$, which is the sum of those values, is not less than 2.

Herein, in moving-image display, when the time-series neighborhood range is too long, scenes transfer rapidly between the representative images extracted from an abnormal image group. Therefore, there is a possibility that observation of the representative images may be difficult. Therefore, in the moving-image display, it is preferably to set the time-series neighborhood range to be comparatively short. On the other hand, in still-image display, the users observe the representative images one by one as taking a required time. Therefore, extracting plenty of similar representative images leads to poor observation efficiency. Therefore, in the still-image display, it is preferable to set the time-series neighborhood range to be comparatively long. Accordingly, when the moving-image display is set in the image processing apparatus, the neighborhood range setting unit 610 sets the extended value $\beta$ to be relatively small, and when the still-image display is set, the neighborhood range setting unit 610 sets the extended value $\beta$ to be relatively large, based on the display information.

In next step S603, the neighborhood range setting unit 610 sets the time-series neighborhood range based on the parameter $\gamma=\alpha+\beta$ with respect to each abnormal image. In other words, the intraluminal images within $\pm\gamma$ range in which each abnormal image is centered are set as one time-series neighborhood range.

In next step S604, when some parts of time-series neighborhood ranges set on abnormal images different from each other are overlapping, the neighborhood range setting unit 610 merges the overlapping time-series neighborhood ranges so as to set them as one time-series neighborhood range. Thereafter, the operations of the calculation unit 600 return to a main routine.

As described above, according to the sixth embodiment of the present invention, each time-series neighborhood range is set adaptively in accordance with the method of displaying the representative images so that the users can efficiently observe the representative images extracted appropriately in accordance with the display method.

In the sixth embodiment, when calculating the parameter γ (see step S603), a coefficient β' or a multiplier β" of the fixed value α may be determined in place of the extended value β to be added to the fixed value α so as to calculate the parameter γ as γ=α×β' or γ=α^β". In this case, in moving-image display, the coefficient β' or the multiplier β" is set to be smaller than in the still-image display.

The method for setting the time-series neighborhood range according to the sixth embodiment may be combined with the methods for setting the time-series neighborhood range of other embodiments. For example, the time-series neighborhood range set in accordance with a classification result of abnormal regions (see the second embodiment, and the modifications 2-1 and 2-2) is narrowed in moving-image display, and is expanded in still-image display.

Similarly, the time-series neighborhood range set in accordance with brightness of each abnormal region (see the third embodiment), a quantity of an unnecessary region (see the fourth embodiment), and types of an organ (see the fifth embodiment) may be adjusted in accordance with the display method.

Furthermore, in the sixth embodiment, every time when the representative images are to be displayed, each time-series neighborhood range is set in accordance with the display method, and extraction of the abnormal image groups each including the identical abnormal regions and extraction of the representative images from each of the abnormal image groups have been carried out. However, these processes may be carried out in advance. In other words, with respect to the series of intraluminal images, an image data set extracting the representative images for the moving-image display, and an image data set extracting the representative images for the still-image display are made in advance with each format and are recorded in the recording unit 50. In displaying images, when the signals specifying the method for displaying the representative images are inputted from the input unit 30 to the control unit 10 in accordance with the user's operation with respect to the input unit 30, the control unit 10 reads out from the recording unit 50 an image data set according to the specified display method and displays the image data set on the display unit 40.

Seventh Embodiment

Figure 23:
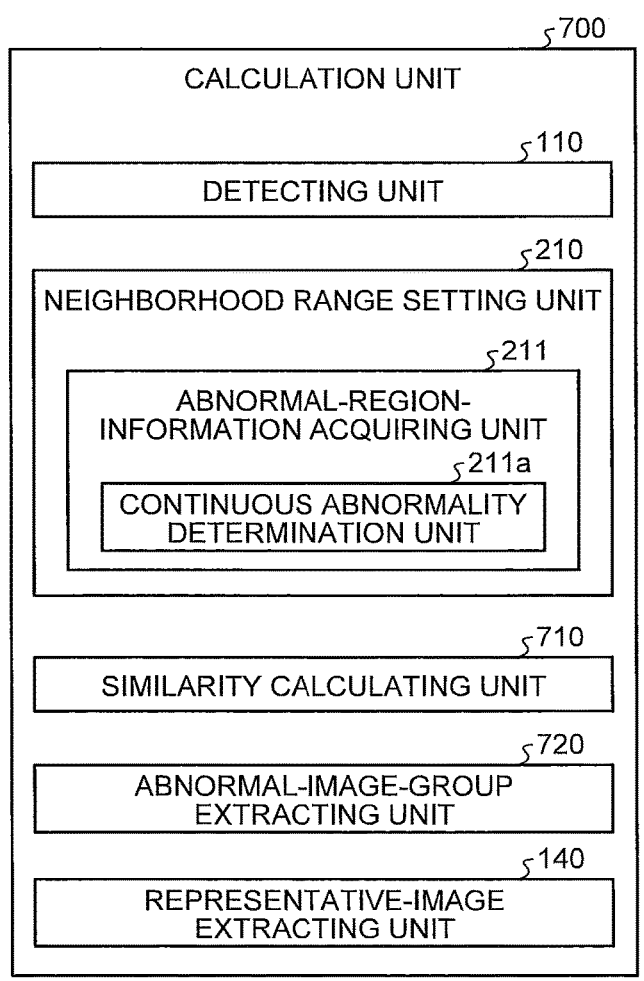
FIG. 23 is a block diagram illustrating a configuration of a calculation unit included in an image processing apparatus according to a seventh embodiment of the present invention.

Next, a seventh embodiment of the present invention will be described. FIG. 23 is a block diagram illustrating a configuration of a calculation unit included in an image processing apparatus according to the seventh embodiment of the present invention. As illustrated in FIG. 23, the image processing apparatus according to the seventh embodiment includes a calculation unit 700 in place of the calculation unit 100 illustrated in FIG. 1. The calculation unit 700 includes a neighborhood range setting unit 210 and an abnormal-image-group extracting unit 720 in place of the neighborhood range setting unit 120 and the abnormal-image-group extracting unit 130 illustrated in FIG. 1. The calculation unit 700 further includes a similarity calculating unit 710. An operation of each unit in the calculation unit 700 except for the neighborhood range setting unit 210, the similarity calculating unit 710, and the abnormal-image-group extracting unit 720, and also the configuration and the operation of each unit in the image processing apparatus except for the calculation unit 700 are similar to those in the first embodiment. Furthermore, operations of the neighborhood range setting unit 210 are similar to those in the second embodiment.

With respect to each time-series neighborhood range set by the neighborhood range setting unit 210, the similarity calculating unit 710 calculates a similarity between abnormal regions in abnormal images included in an identical time-series neighborhood range. A method for calculating the similarity should not be specifically limited. Such an example includes a method for calculating features, such as a color feature, shape feature, and texture feature, of each abnormal region so as to regard a distance between the abnormal regions in feature space as the similarity.

The abnormal-image-group extracting unit 720 extracts, from each time-series neighborhood range, abnormal image groups each including the identical abnormal regions based on each time-series neighborhood range set by the neighborhood range setting unit 210 and the similarity calculated by the similarity calculating unit 710.

Figure 24:
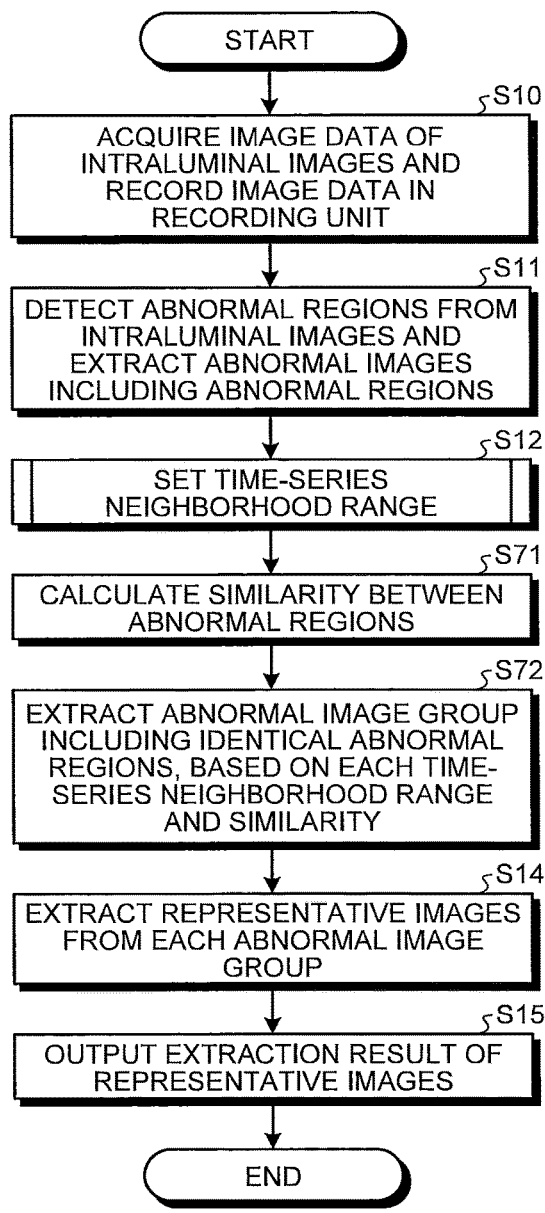
FIG. 24 is a flowchart illustrating operations of the image processing apparatus according to the seventh embodiment of the present invention.

Next, operations of the image processing apparatus according to the seventh embodiment will be described. FIG. 24 is a flowchart illustrating operations of the image processing apparatus according to the seventh embodiment. In this flowchart, steps S10 and S11 are similar to the first embodiment. Furthermore, step S12 is similar to the second embodiment (see FIG. 5 and FIG. 6).

In step S71 after step S12, with respect to each time-series neighborhood range set in step S12, the similarity calculating unit 710 calculates the similarity between the abnormal regions included in each time-series neighborhood range.

In next step S72, the abnormal-image-group extracting unit 720 extracts the abnormal image groups each including identical abnormal regions based on each time-series neighborhood range set in step S12 and the similarity calculated in step S71.

Figure 25:
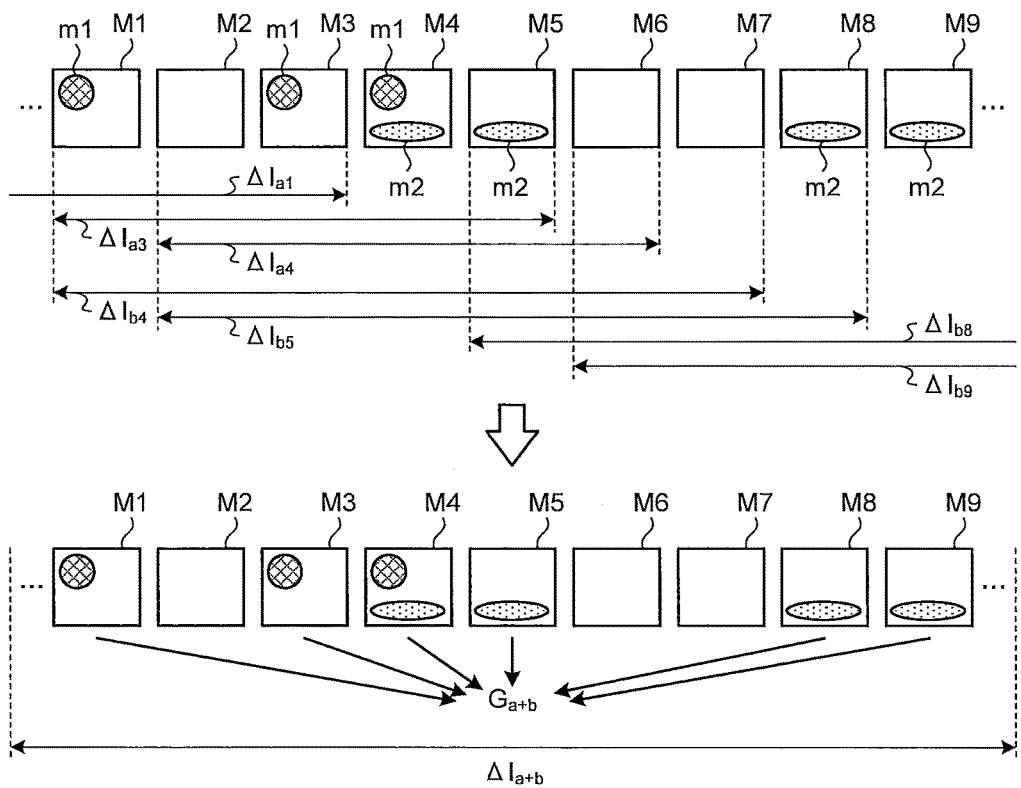
FIG. 25 is a schematic view for explaining a process of extracting an abnormal image group in the seventh embodiment of the present invention.
Figure 26:
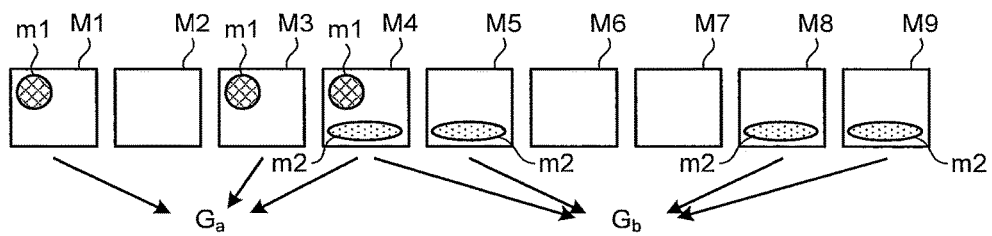
FIG. 26 is a schematic view for explaining a process of extracting abnormal image groups in the seventh embodiment of the present invention.

FIG. 25 and FIG. 26 are schematic views for explaining the process of extracting the abnormal image groups, and illustrate intraluminal images M1 to M9 arranged in time-series. Among these intraluminal images, an abnormal region m1 which is an intermittent abnormal region is detected from the intraluminal images (abnormal images) M1, M3, and M4, whereas, an abnormal region m2 which is a continuous abnormal region is detected from the intraluminal images (abnormal images) M4, M5, M8, and M9. Therefore, as illustrated in FIG. 25, in regard to the abnormal images M1, M3, and M4, time-series neighborhood ranges $\Delta I_{a1}$, $\Delta I_{a3}$, and $\Delta I_{a4}$ are each set to be within ±2 range (γ=2) in which each of those abnormal images is centered. In regard to the abnormal images M4, M5, M8, and M9, time-series neighborhood ranges $\Delta I_{b4}$, $\Delta I_{b5}$, $\Delta I_{b8}$, and $\Delta I_{b9}$ are each set to be within ±3 range (γ=3) in which each of those abnormal images is centered.

Merging the partially overlapping time-series neighborhood ranges with respect to these time-series neighborhood ranges $\Delta I_{a1}$, $\Delta I_{a3}$, $\Delta I_{a4}$, $\Delta I_{b4}$, $\Delta I_{b5}$, $\Delta I_{b8}$, and $\Delta I_{b9}$ may lead to set one time-series neighborhood range $\Delta I_{a+b}$ including the intraluminal images M1 to M9, as similar to the first to sixth embodiments. Therefore, the abnormal images M1, M3, M4, M5, M8, and M9 included in the time-series neighborhood range $\Delta I_{a+b}$ will be extracted as one abnormal image group $G_{a+b}$. However, the abnormal image group $G_{a+b}$ includes different abnormal regions m1 and m2. Therefore, when extracting the representative images from the abnormal image group $G_{a+b}$, there is a possibility of outputting only one of the abnormal regions m1 and m2 as representative.

Accordingly, in the seventh embodiment, extraction of the abnormal image groups is carried out based on each time-series neighborhood range and the similarity between the abnormal regions. In detail, the abnormal-image-group extracting unit 720 extracts, from the abnormal images within one time-series neighborhood range, abnormal images in which a similarity between the abnormal regions is higher than a predetermined threshold, as the abnormal image group including the identical abnormal regions. As a result, as illustrated in FIG. 26, the abnormal images M1, M3, and M4 each including the abnormal region m1 and the abnormal images M4, M5, M8, and M9 each including the abnormal region m2 can be independently extracted as different abnormal image groups $G_a$ and $G_b$. Therefore, by extracting representative images from each of the abnormal image groups $G_a$ and $G_b$, both of the abnormal regions m1 and m2 can be outputted as the representative. Operations of steps S14 and S15 subsequent to step S72 are similar to the first embodiment.

As described above, according to the seventh embodiment of the present invention, the abnormal image groups including the identical abnormal regions are extracted based on each time-series neighborhood range set adaptively in accordance with the types of the abnormal regions and the similarity between the abnormal regions. Therefore, in the series of the intraluminal images arranged in time-series, even in a case where the interval between the abnormal images including different abnormal regions is short, the abnormal images including different abnormal regions can be properly extracted as the different abnormal image groups. Accordingly, the abnormal images including the abnormal region detected from the series of the intraluminal images can be extracted as the representative images without omission nor overlapping.

Modification 7-1

Next, a modification 7-1 of the seventh embodiment of the present invention will be described. In the seventh embodiment, the similarity calculating unit 710 calculates the similarity between the abnormal regions. In this case, as illustrated in FIG. 26, the abnormal images M1, M3, and M4 each including the abnormal region m1 with a high similarity can be extracted as one abnormal image group $G_a$ and the abnormal images M4, M5, M8, and M9 each including the abnormal region m2 with a high similarity can be extracted as one abnormal image group $G_b$.

However, in addition to the similarity between the abnormal regions, a similarity between regions other than the abnormal regions may be calculated. Taking both of these similarities into consideration, abnormal image groups may be extracted. In this case, a similarity of regions other than the abnormal region m1 is low between the abnormal images M1 and M3 and the abnormal image M4 so that they cannot be included in an identical abnormal image group. Furthermore, a similarity of regions other than the abnormal region m2 is low between the abnormal image M4 and the abnormal images M5, M8, and M9 so that they cannot be included in an identical abnormal image group. As a result, the abnormal image M4 will be extracted as an abnormal image group different from an abnormal image group including the abnormal images M1 and M3 and from an abnormal image group including the abnormal images M5, M8, and M9.

Modification 7-2

Next, a modification 7-2 of the seventh embodiment of the present invention will be described. In the seventh embodiment, as similar to the second embodiment, the parameter γ of each time-series neighborhood range is determined in accordance with the determination result indicating whether each abnormal region is the continuous abnormal region. However, the parameter γ may be set to be a fixed value of 2 or more as similar to the first embodiment, or may be determined in accordance with a determination result of each abnormal region as similar to the modifications 2-1, 2-2. Alternatively, the parameter γ may be determined, as similar to the third to sixth embodiments, in accordance with brightness of each abnormal region, a quantity of an unnecessary region, types of an organ shown in each abnormal image, a method for displaying representative images, and the like. In these cases, in place of the neighborhood range setting unit 210 illustrated in FIG. 23, it is preferable to apply the neighborhood range setting units 120, 230, 250, 310, 410, 510, and 610 in the first embodiment, the modifications 2-1, 2-2, and the third to sixth embodiments.

In the first to seventh embodiments, based on the parameter γ, each time-series neighborhood range is set within a range of ±γ in which an abnormal image is centered. However, each time-series neighborhood range may not be necessarily set symmetrically with respect to the abnormal image. For example, a time-series neighborhood range may be set within a range of +γ in which an abnormal image located first.

The abovementioned image processing apparatus according to the first to seventh embodiments and the modifications thereof can be achieved by executing an image processing program recorded in a recording medium by using a computer system such as a personal computer and a work station. Furthermore, such computer systems may be used as being connected to other computer systems or devices such as a server through public networks such as a local area network (LAN), a wide area network (WAN), and the Internet. In this case, the image processing apparatus according to the first to seventh embodiments and the modifications thereof may acquire image data of intraluminal images through these networks, or may output image processing results to various output devices (a viewer, a printer, and the like) connected through these networks, or may store the image processing results to a storage device (a recording medium, a reader thereof, and the like) connected through these networks.

According to some embodiments, an image-of-interest group extracting unit uses a time-series neighborhood range to extract an image-of-interest group including identical regions of interest. As the time-series neighborhood range, a range wider than an interval between images that are continuous in time series in a group of a series of images is set. Therefore, even though it is difficult to keep imaging a subject in a stable state due to characteristics of a living body or changes in image capturing conditions, it is possible to easily extract images of interest including the identical regions of interest, as an identical image-of-interest group, thereby to extract representative images properly.

Note that the present invention should not be limited to the first to seventh embodiments and the modifications thereof. A plurality of elements disclosed in each of the embodiments and modifications can be appropriately combined so as to form various inventions. For example, some elements may be removed from all the elements disclosed in each of the embodiments and modifications, or the elements illustrated in different embodiments or modifications may be appropriately combined so as to form various inventions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a processor comprising hardware, wherein the processor is configured to:
retrieve a series of images acquired by sequential imaging;
detect, in the series of images retrieved, one or more regions of interest based on predetermined criteria;
extract, from the series of images, images of interest including the one or more regions of interest detected;
for each of the images of interest extracted, set, from the series of images, a time-series neighborhood range of images,
wherein the time-series neighborhood range of images includes the each of the images of interest extracted and one or more images from the series of images continuous in time-series with the each of the images of interest extracted;
merge a plurality of time-series neighborhood ranges of images that are at least partly overlapped with one another into a merged time-series neighborhood range of images;
extract, from the images of interest that are included in the merged time-series neighborhood range of images, a group of images of interest;
extract, form the group of images of interest, a representative image; and
output image data of the representative image to a display.

2. The image processing apparatus according to claim 1, wherein the processor is configured to:
acquire information on the one or more regions of interest; and
set the time-series neighborhood range of images based on the information on the one or more regions of interest acquired.

3. The image processing apparatus according to claim 2, wherein the processor is configured to:
classify the one or more regions of interest into types of the regions of interest; and
acquire a classification result of the types of the regions of interest as information on the one or more regions of interest.

4. The image processing apparatus according to claim 3, wherein the processor is configured to:
determine whether the one or more regions of interest are continuous regions of interest that are continuously observable; and
in a case where the one or more regions of interest are the continuous regions of interest, set the time-series neighborhood range of images to be wider than in a case where the one or more regions of interest are not the continuous regions of interest.

5. The image processing apparatus according to claim 4, wherein the processor is configured to:
determine that the continuous regions of interest include a region corresponding to one of bleeding, mucosal abnormality, and vascular abnormality.

6. The image processing apparatus according to claim 3, wherein the processor is configured to:
determine whether the one or more regions of interest are intermittent regions of interest that are intermittently observable; and
in a case where the one or more regions of interest are the intermittent regions of interest, set the time-series neighborhood range of images to be narrower than in a case where the one or more regions of interest are not the intermittent regions of interest.

7. The image processing apparatus according to claim 6, wherein the processor is configured to:
determine that the intermittent regions of interest include a region corresponding to one of redness, a bleeding point, and an ulcer.

8. The image processing apparatus according to claim 2, wherein the processor is configured to:
calculate red to calculate brightness of the one or more regions of interest as the information on the one or more regions of interest; and
set the time-series neighborhood range of images to be narrow as the brightness becomes higher.

9. The image processing apparatus according to claim 8, wherein the processor is configured to:
calculate the brightness based on at least one of contrast and size of each of the one or more regions of interest.

10. The image processing apparatus according to claim 1, wherein the processor is configured to:
detect, from the each of the images of interest extracted, a quantity of an unnecessary region that does not correlate with the one or more regions of interest; and
for the each of the images of interest extracted, set the time-series neighborhood range in accordance with the quantity of the unnecessary region.

11. The image processing apparatus according to claim 1, wherein the processor is configured to:
classify types of an organ shown in the images of interest; and
for the each of the images of interest extracted, set the time-series neighborhood range of images in accordance with the types of the organ.

12. The image processing apparatus according to claim 11, wherein the processor is configured to:
in a case where the types of the organ shown in the images of interest are an organ to be examined, for the each of the images of interest extracted, set the time-series neighborhood range of images to be narrower than in a case where the types of the organ shown in the images of interest are not the organ to be examined.

13. The image processing apparatus according to claim 1, wherein the processor is configured to:
for the each of the images of interest extracted, set the time-series neighborhood range in accordance with a method for displaying the representative image.

14. The image processing apparatus according to claim 13, wherein the processor is configured to:
in a case where the representative image is displayed as a still image, for the each of the images of interest extracted, set the time-series neighborhood range to be wider than in a case where the representative image is displayed as a moving image.

15. The image processing apparatus according to claim 1, wherein the processor is configured to:
- calculate a similarity between the regions of interest that are different from one another; and
- extract, from the images of interest that are included in the merged time-series neighborhood range of images, the group of images of interest based on the similarity between the regions of interest.

16. The image processing apparatus according to claim 15,
wherein the processor is configured to:
- extract, from the images of interest that are included in the merged time-series neighborhood range of images, images of interest in which the similarity between the regions of interest different from one another is higher than a threshold, as the group of images.

17. An image processing method comprising:
- retrieving a series of images acquired by sequential imaging;
- detecting, in the series of images retrieved, one or more regions of interest based on predetermined criteria;
- extracting, from the series of images, images of interest including the one or more regions of interest detected;
- for each of the images of interest extracted, setting, from the series of images, a time-series neighborhood range of images,
  - wherein the time-series neighborhood range of images includes the each of the images of interest extracted and one or more images from the series of images continuous in time-series with the each of the images of interest extracted;
- merging a plurality of time-series neighborhood ranges of images that are at least partly overlapped with one another into a merged time-series neighborhood range of images;
- extracting, from the images of interest that are included in the merged time-series neighborhood range of images, a group of images of interest;
- extracting, from the group of images of interest, a representative image; and
- outputting image data of the representative image to a display.

18. A non-transitory computer-readable recording medium with an executable program stored thereon, the program causing a computer to at least execute:
- retrieving a series of images acquired by sequential imaging;
- detecting, in the series of images retrieved, one or more regions of interest based on predetermined criteria;
- extracting, from the series of images, images of interest including the one or more regions of interest detected;
- for each of the images of interest extracted, setting, from the series of images, a time-series neighborhood range of images,
  - wherein the time-series neighborhood range of images includes the each of the images of interest extracted and one or more images from the series of images continuous in time-series with the each of the images of interest extracted;
- merging a plurality of time-series neighborhood ranges of images that are at least partly overlapped with one another into a merged time-series neighborhood range of images;
- extracting, from the images of interest that are included in the merged time-series neighborhood range of images, a group of images of interest;
- extracting, from the group of images of interest, a representative image; and outputting image data of the representative image to a display.

19. The image processing apparatus according to claim 1, wherein the processor is configured to:
- for the each of the images of interest extracted, set the time-series neighborhood range of images symmetrically with respect to the each of the images of interest extracted.

20. The image processing apparatus according to claim 1, wherein the processor is configured to:
- for the each of the images of interest extracted, set the time-series neighborhood range of images so that the each of the images of interest extracted is located first in the time-series neighborhood range of images.

* * * * *